United States Patent [19]
Harrell

[11] Patent Number: 5,671,401
[45] Date of Patent: *Sep. 23, 1997

[54] APPARATUS FOR EFFICIENTLY ACCESSING GRAPHIC DATA FOR RENDERING ON A DISPLAY

[75] Inventor: Chandlee Bryant Harrell, Mountain View, Calif.

[73] Assignee: Silicon Graphics, Inc., Mountain View, Calif.

[*] Notice: The term of this patent shall not extend beyond the expiration date of Pat. No. 5,457,779.

[21] Appl. No.: 438,044

[22] Filed: May 8, 1995

Related U.S. Application Data

[63] Continuation of Ser. No. 4,963, Jan. 15, 1992, Pat. No. 5,457,779.

[51] Int. Cl.$^6$ .................................................. G06T 1/20
[52] U.S. Cl. ........................................ 395/505; 395/141
[58] Field of Search ................................ 395/163, 119, 395/141, 133, 123, 502, 505

[56] References Cited

U.S. PATENT DOCUMENTS

| | | | |
|---|---|---|---|
| 4,945,500 | 7/1990 | Deering | 395/122 |
| 5,070,465 | 12/1991 | Kato et al. | 395/141 |
| 5,129,051 | 7/1992 | Cain | 395/133 X |
| 5,287,436 | 2/1994 | Fischer et al. | 395/133 X |
| 5,457,779 | 10/1995 | Harrell | 395/502 |

OTHER PUBLICATIONS

Foley, et al., "Computer Graphics Principles and Practice", 2nd Edition Addison–Wesley Publishing Company 1990 pp. 873–876 and 899–900.

Foley, et al. "Computer Graphics Principles And Practice", 2nd. edition, Addison–Wesley Publishing Co., 1990, pp. 873–876 and 899–900.

*Primary Examiner*—Mark K. Zimmerman
*Attorney, Agent, or Firm*—Blakely, Sokoloff, Taylor & Zafman

[57] ABSTRACT

An electronic logic and computer implemented apparatus and method for accessing graphic geometric data within a computer display system utilizing an SIMD environment. The present invention spreads the vertex data structure of geometric primitives across multiple memories allowing much higher bandwidth access into the data structure for greater performance. The present invention eliminates branches from the processing of triangle and quadrilateral primitives allowing full utilization of SIMD processors. The present invention utilizes an indirection circuit and software to control the order of coupling of these memory units to the inputs of specialized graphic processors. Therefore, the indirection mechanism allows a geometric data structure to be spread across multiple memories in a multi-memory/ multi-bus environment with indirection across these multiple busses and memories. The present invention provides full utilization of a SIMD processor processing triangles or quadrilaterals and performs splitting of quads and ordering of triangle vertices in hardware.

22 Claims, 14 Drawing Sheets

201

PRIOR ART

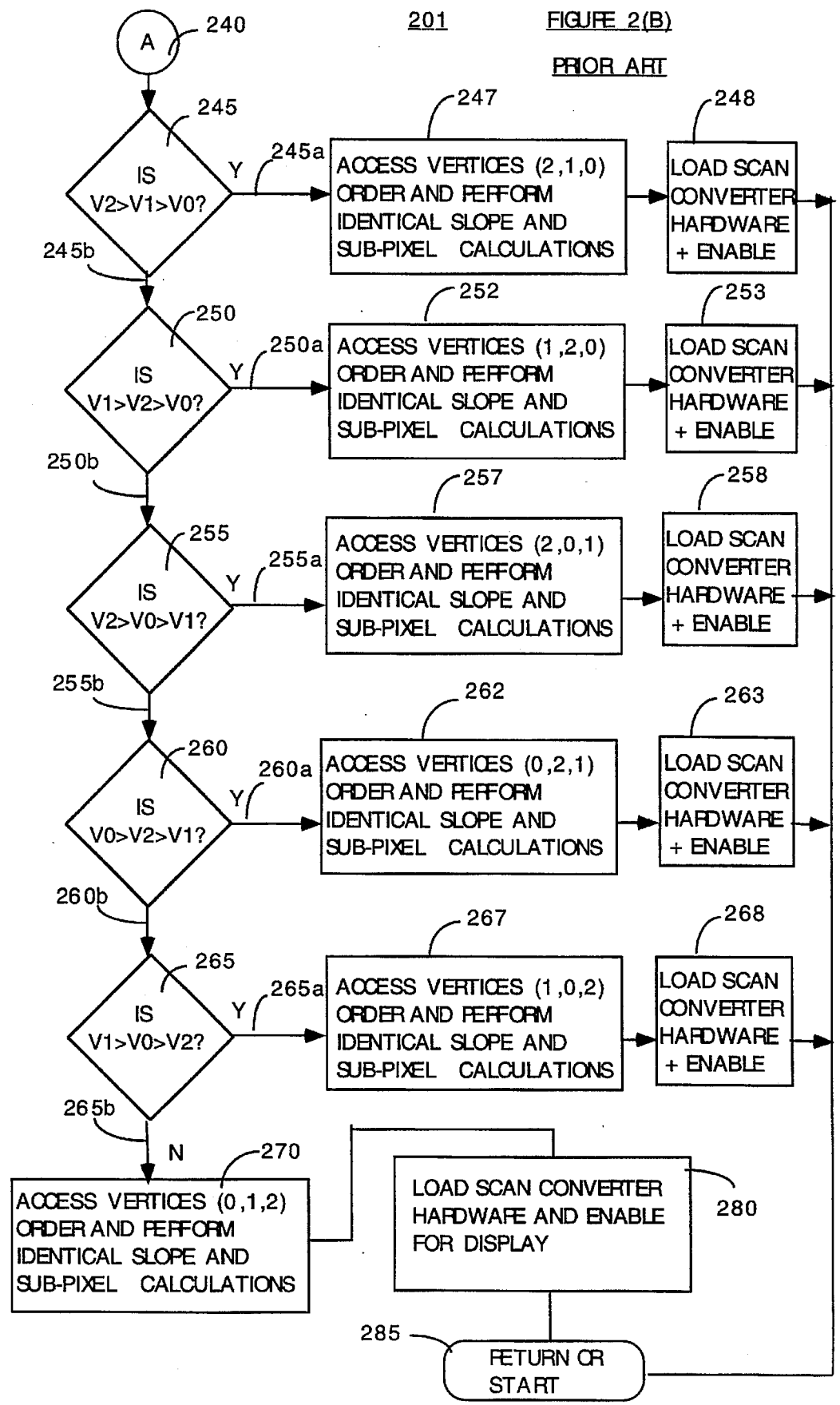

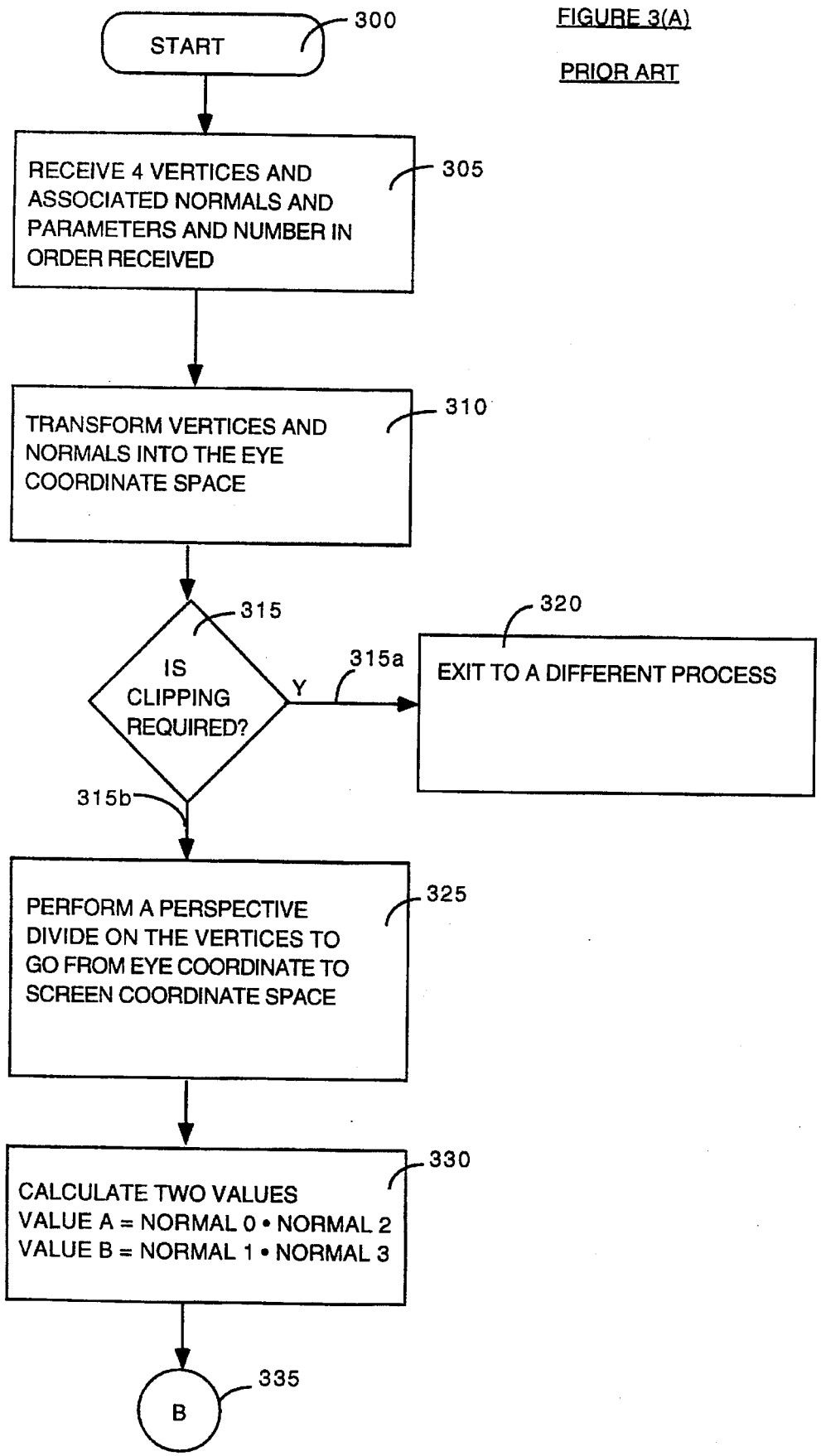

INPUT/OUTPUT MAP FOR COMBINATIONAL LOGIC 710 FOR LINE 712 = 10

| | LINE 791 = 1 | | LINE 791 = 0 | | |
|---|---|---|---|---|---|
| | line 765 = 0 | line 765 = 1 | line 765 = 0 | line 765 = 1 | |
| (STATE) | 0<1<2, 0<2<1, 1<0<2, 1<2<0, 2<0<1, 2<1<0 | 0<2<3, 0<3<2, 2<0<3, 2<3<0, 3<0<2, 3<2<0 | 0<1<3, 0<3<1, 1<0<3, 1<3<0, 3<0<1, 3<1<0 | 1<2<3, 1<3<2, 2<1<3, 2<3<1, 3<1<2, 3<2<1 | |
| MIN | 0 0 1 1 1 2 2 | 0 0 2 2 2 3 3 | 0 0 1 1 1 3 3 | 1 1 2 2 2 3 3 | INPUT LINE 730c |
| MID | 1 2 0 2 2 0 1 | 2 3 0 3 3 0 2 | 1 3 0 3 3 0 1 | 2 3 1 3 3 1 2 | INPUT LINE 730b |
| MAX | 2 1 2 0 0 1 0 | 3 2 3 0 0 2 0 | 3 1 3 0 0 1 0 | 3 2 3 1 1 2 1 | INPUT LINE 730a |
| SEL 0 | 0 0 1 1 2 2 3 3 | 0 0 2 2 3 3 | 0 0 1 1 3 3 | 1 1 2 2 3 3 | OUTPUT LINE 776 |
| SEL 1 | 2 3 0 3 3 0 2 | 2 3 0 3 3 0 2 | 1 3 0 3 3 0 1 | 2 3 1 3 3 1 2 | OUTPUT LINE 775 |
| SEL 2 | 3 2 3 0 2 0 | 3 2 3 0 2 0 | 3 1 3 0 1 0 | 3 2 3 1 2 1 | OUTPUT LINE 774 |
| SEL 3 | * * * * * * * | * * * * * * * | * * * * * * * | * * * * * * * | OUTPUT LINE 773 |

FIGURE 10(B)

APPARATUS FOR EFFICIENTLY ACCESSING GRAPHIC DATA FOR RENDERING ON A DISPLAY

This is a continuation of application Ser. No. 08/004,963, filed Jan. 15, 1992, which issued into U.S. Pat. No. 4,457,779 on Oct. 10, 1995.

BACKGROUND OF THE INVENTION

1. Field of the Invention

The present invention relates to the field of image display systems. Specifically, the present invention relates to the field of computer image display systems utilizing geometric graphic primitives.

2. Prior Art

Computer systems may be implemented with graphics processors for display of computer information and graphic images on a display screen. These displays represent information and data within the computer system that simulate an artificial environment that is generated by the computer image system. One of the primary functions of a graphics processor for image display is to create a visual rendition of a true surface when passed a computerized model for that surface. The surface model or data that represents the visual rendition approximates the true mathematical equations for the true surface. These equations representing the true surface may be generated or given via physics, however, the surface generated by the computer graphic system will be composed of approximations to the true surface. These approximations are accomplished by using simple geometric objects, or graphic primitives, to construct the data model of the true surface. Simple and standardized geometric primitives are utilized by computer display systems because standard, and well understood hardware can be utilized to process these geometric primitives at very high speeds. Moreover many of these hardware processors are specially tailored for a particular type of geometric primitive. Therefore, it is advantageous to break true surfaces down into data models that approximate the true surface but are composed of a multitude of graphic primitives. The manner in which such graphic or geometric primitives are rendered (i.e., displayed on a computer screen), becomes vital to the processing power and efficiency of the overall computer graphic system.

In order to understand aspects and advantages of the present invention over the prior art systems for rendering geometric primitives, a discussion of prior art computer graphic systems is presented herein. Typical graphic or geometric primitives used in computer graphic systems for representing surfaces are the four sided polygon (quadrilateral, with four vertices) and the three sided polygon which is a triangle having three vertices. By constructing a multitude of these graphic primitives and placing them together, a computerized data model can be constructed as an approximation of a true surface. The approximation will be displayed according to processing technology performed in specialized and high speed hardware units.

The Hardware Scan Converter

FIG. 1 illustrates a typical geometric primitive 20 triangle having three vertices 6, 5, and 7. A typical primitive will be defined by a specialized data structure. Graphic processors operate on primitives by operating on specialized data structures of the primitive. The data structure for a primitive is composed of a certain number of vertices with a certain number of parameters or attributes for each vertex. For a triangle primitive, there are three vertices and for a quadrilateral primitive ("quad") there are four vertices. The array notation, TRIANGLE [V][P], represents this triangle primitive 20 of FIG. 1 within the computer graphic system where the size of V represents the number of vertices within the data structure and P represents various parameters that are associated with each vertex of the triangle primitive. A triangle primitive will have V=3 and each of the coordinates that comprise the triangle will be present within the data structure. Further, other parameters that comprise attributes of the triangle are present within the data structure associated with each vertex of each primitive, such as positional information (x, y, z) parameters, color information (read, green, blue, and alpha) parameters, and the surface normal vectors (Nx, Ny, Nz) at each vertex. All of this information is present for each vertex of a graphic primitive. Therefore, for each of the vertices 5, 6, 7 of the triangle 20, the data structure defines position, surface normal vectors, and color. A computer system processing this primitive would have access to all of this information for generation of this primitive accurately onto a computer screen. Similarly, a quadrilateral may be defined by the array notation, QUAD [V][P], where V=4 and P represents the parameters for each vertex of the quadrilateral.

It is appreciated that computer graphic systems have various processors that perform different tasks. In standard computer graphic systems, a main microprocessor performs some of the specialized steps required to generate a graphic primitive onto the display screen ("render the primitive") and leaves other tasks to a "scan conversion" hardware unit that is tailored to generate a specific type of graphic primitive onto the display screen. The scan conversion typically refers to the fixed point iteration section of the rendering process. Computer graphic systems utilize a display screen that is composed of addressable picture elements called pixels that are arranged in a matrix on the display screen. Graphic primitives are displayed by illuminating the pixels on the display screen that correspond to the desired positional location of graphic primitive. It is appreciated that since pixel sizes are not infinitely small, the actual display of a graphic primitive will be an approximation of that primitive using a pixel pattern on the display screen. Of course, the smaller the pixel size the better the resolution of the displayed primitive. Therefore, since primitives are displayed on a computer screen utilizing pixels, it is the task of the specialized scan conversion hardware to convert a graphic primitive stored in a data structure, TRIANGLE[V][P], into a pattern of pixels for display, this pixel pattern is often called a bitmap and the action of generating the pixel pattern is called a scan conversion since the pattern is generated a pixel line at a time in a "scanned" fashion.

FIG. 1 illustrates the triangle primitive 20. Coordinate indicator 15 is illustrated to show the x and y scheme used in this discussion; the x and y coordinate values represent the two dimensional coordinate scheme used on the screen display. In the prior art, a main processor of a computer graphic system, or multiple processors, will input the data structure, TRIANGLE[V][P], and via a specialized routine calculate the slopes $(dx/dy)_1$, $(dx/dy)_2$, and $(dx/dy)_3$, which are illustrated in FIG. 1 as slopes 10, 12, and 11 respectively of the edges of the triangle primitive. Slope 10 is the slope of the line from vertex 5 to vertex 7 while slope 11 is the slope of the line from vertex 5 to vertex 6. Slope 12 is the slope of the line from vertex 6 to vertex 7. By calculating these slopes and supplying them to the scan conversion hardware, the scan conversion hardware can determine which pixels lie within the triangle primitive for display. In order to compute these three slopes, the main processor of the computer graphics system must be presented with the triangle data structure with the vertex data arranged in a particular order.

In the case of a triangle primitive, the main processor, due to interests of speed, has specialized routines ("processors") that are designed to first accept the vertex having the largest y coordinate value as the vertex in position 5 (assume the first vertex data read), secondly accept the vertex with the middle y coordinate value as the vertex in position 6 (assume the second vertex data read), and then accept the vertex having the smallest y coordinate value as the vertex in position 7 (assume the last vertex). The exact order of receipt of this data for any given ymax, ymid, or ymin value is not important, what is vital is that the routine be able to predict the vertex having the ymin or ymid or ymax value depending on the order in which the vertices were passed to the specialized routine. In this example, the routine must always have ymax sent first, then ymid, then lastly ymin. This is the case because the slope calculation as shown in FIG. 1, assume for slope 1, involves (ymax−ymin), and for slope 2 requires (ymid-ymin), and for slope 3 requires (ymax−ymin). (It is appreciated that the terminology xmax within FIG. 1 does not refer to the maximum x value of the three vertices 5, 6, 7, but rather refers to the x coordinate location of the ymax vertex; therefore xmax is the x coordinate for vertex 5, xmid is the x coordinate of vertex 6, and xmin is the x coordinate for vertex 7.) Due to processing time constraints, the specialized routine is not able to determine (or does not have the time to determine) which vertex contains which y value. The y value order must be communicated to the specialized routine by virtue of the order or fashion in which the vertices 5, 6, 7 are supplied to the routine. Therefore, it is advantageous to develop a system that will quickly and efficiently supply a primitive's vertex data to a specialized routine in the order (of ymid, ymin, ymax) that the specialized routine expects.

The specialized routines of the computer system also calculate several partial derivatives, 21–25 of FIG. 1, (for both dx and dy) of the parameters contained within the data structure for the triangle primitive 20. Partial derivatives 21 (dr/dx, and dr/dy) indicate the change in red parameter for each pixel location change in the x direction and for each change in the y direction, respectively, for the pixels located within the triangle primitive 20. Likewise partial derivatives 22 and 23 indicate the change in green color and change in blue color for every pixel location change in x and y, respectively, for the pixels located within the triangle primitive. The routine computes these values by first calculating, for each, specialized end point values of pixels located on the edges and vertices of the primitive. For example, to compute the partial derivatives 21 for red, the main routine first obtains the red value for the vertex 6 (associated with ymid) which should be directly available from the data structure TRIANGLE[V][P]; this value is called red1. Next, the computer routine calculates the coordinates of point 8 along the line from ymax to ymin that intersects the line having the equation of y=ymid. The computer routine then computes the values of red at this point 8 based on the values of red stored for vectors 5 and 7 which are available within the data structure for primitive 20, this value is called red2. This calculation of red2 is performed by first determining an equation for the parameter of red along the line from vertex 5 to vertex 7 and then computing the red value at point 8, along that line. The partial derivative (dr/dx) will then be the difference between the red2 value and the red1 value divided by the difference between the x coordinates at point 8 and at vertex 6 (ymid). The computer routine performs this calculation.

The other partial derivative, dr/dy of 21, is computed in a similar method. First, either vertex 5 or vertex 7 is selected. It is preferred that the vertex having the middle x coordinate is used. For this example, vertex 7 is selected, its red value is recorded by the data structure and is red3. A line having an equation of the x coordinate value of vertex 7 is projected onto the line from ymax vertex 5 to ymid vertex 6 to solve for the location of point 9. Similarly, the red value at point 9 is Computed as a function of the red value at vertex 5, the red value at vertex 6 and the location of point 9 along the line between vertex 5 and vertex 6; this red value is called red4. Then, the partial derivative dr/dy is computed as the difference between red4 and red3 divided by the difference between the y coordinate values at point ymin vertex 7 and at point 9. The above explanation can be extended to apply to the other partial derivatives 22–25 and any others that may be employed to constitute the graphic primitive 20.

The computer routine or ("processor") then completes several sub-pixel correction computations for the triangle primitive 20. Pixel points xminL 26 and xminR 27 are also computed by the computer routine as the lowest rightmost and leftmost pixels that form the primitive 20. These points may or may not lie on the edge of the primitive because the pixel pattern will only be an approximation of the primitive and therefore the edge of the polygon may fall in a space between adjacent pixels. These points, 26 and 27, represent the sub-pixel corrections to the nearest scan line that will be used to generate the pixels for display; this can be done by approximating the (x, y) values of points 26 and 27 to the nearest integer values of the y coordinate along the [ymid, ymin] and [ymax, ymin] vectors. Along with these two pixel points, 26 and 27, the computer processor computes the initial values of each parameter (i.e., color, etc.) in order to set the initial values used for the scan conversion hardware for these points. In so doing, when the specialized computer routine sends the scan conversion hardware the initial values (for points 26 and 27), the scan conversion hardware can utilize the partial derivatives to determine the attributes of each pixel within the primitive 20 according to its relative displacement in x and y from the initial points 26 and 27. The scan conversion hardware determines the locations of the points within the polygon 20 by using the three slope equations supplied.

Therefore, for each triangle primitive the computer processor's specialized routine performs the functions of: (1) generating the three slope equations 10, 12, 11; (2) generating the partial derivatives for each of the parameters 21–25; (3) performing sub-pixel corrections by generating the initial locations and parameters for points 26 and 27 and then (4) transferring all of this information to a specialized hardware scan conversion hardware unit which will generate the actual pixel pattern or bitmap for the geometric primitive 20. The specialized scan conversion hardware will then begin to generate all of the pixels for the display of the primitive once it has all of the initialization data, the slopes and the partial derivatives. The way in which the scan conversion hardware generates the pattern is well known in graphics technology and it may be done in a scanning fashion either horizontally, or vertically with scan lines. Basically, the hardware starts at points 26, 27 and will generate horizontal scan lines across the entire primitive until all of the pixels are generated. It will determine the pixels within each horizontal scan line (having a particular y coordinate) by using the supplied slopes. It will determine the other parameters of each pixel by utilizing the initial values of these parameters from the pixels 26 and 27 and by calculating addition or subtraction values based on the partial derivatives and the x and y displacements of each pixel from the initial points 26 and 27. The hardware processing unit will continue until each pixel within the primitive is generated and output to the display screen. Then, the specialized computer routine and the scan conversion hardware will be ready for another graphic primitive to render.

The important aspect of these specialized computer routines for generating slopes, partial derivatives and sub-pixel corrections is that they require the vertex data of a triangle primitive's data structure to arrive within a specific order (i.e., ymax, ymid, ymin). Therefore, it is advantageous for a computer graphics system to provide such order without the need for multiple branch testing in software. To this extent, the detail of the performance of such specialized computer processors and hardware scan converters is not required for a complete understanding of the present invention. However, for more background information regarding the details of such a hardware generation circuit refer to the copending application Ser. No. 7-657,087 entitled Method for Scan Converting Shaded Triangular Polygons and for Determining the Coverage of Pixels in Polygons, which was filed on Feb. 19, 1991 and assigned to the assignee of the present patent application.

As discussed previously, the specialized routine for performing the slope, partial derivative, and sub-pixel correction calculations expects to receive the vertices of an input triangle primitive in a particular order, determined by y screen coordinate values of the vertices, or alternatively, based on the x screen coordinate values of the vertices. However, the vertices within the data structures of the primitives are not stored in such an order. Rather, the data structures containing the vertices are stored according to an arbitrary fashion by selecting one vertex as vertex0 and then rotating around the triangle to select the other vertices, vertex1 and vertex2, or for a quad primitive to select an arbitrary vertex for vertex0 and then rotating around the quadrilateral to select vertices 1, 2 and 3. The reason for this is that the computer graphics program can and does generate vertices in this arbitrary order.

Therefore, since the vertex data for primitives are not stored in any order with respect to the y screen value, and further since the specialized processors of the graphic system requires that it be supplied vertex data in a particular order corresponding to the y screen values, the computer processor must perform several comparison operations in order to determine which vertex within a triangle primitive's data structure is the maximum y vertex (ymax), the middle y vertex (ymid) and the minimum y vertex (ymin). Given a basic triangle geometric primitive having three vertices, there are six different possible orderings of vertices. For instance, vertex0 could have a y value larger than the y value of vertex1 which is larger than the y value of vertex 2 for an arrangement called "0>1>2." There could also be: 1>0>2, or 0>2>1, or 2>0>1 or 1>2>0 or lastly 2>1>0. The computer processor must compare each of the vertices to determine in which order they lie. When two of the vertices are equal, the ordering may adopt one of the above combinations. If the condition is (ymax>ymid=ymin) then the (ymax>ymid>ymin) case may be used or the (ymax>ymin>ymid) case can be used. Likewise, if the (ymax=ymid>ymin) is case is present then the (ymax>ymid>ymin) case may be used or the (ymid>ymax>ymin) case can be used. As shown, the equal vertices are completely interchangeable. If the all vertices are equal (i.e., a line) then they can adopt any of the six above cases.

It is appreciated that due to the vast number of calculations performed by a graphics processor, the need for efficiency is great. In order words, there is not enough processing time or power in order for the computer processor to rearrange the vertices of a particular triangle primitive to match the order that is expected for any given or particular specialized processor (i.e. for slope, partial derivatives, or sub-pixel corrections). Instead, in high performance graphics processors, a separate specialized routine is supplied for each of the six possible combinations of vertex orderings based on y coordinate values. There is a separate specialized routine tailored to process the 0>1>2 case, one for the 0>2>1 case, one for the 1>2>0 case, and so forth for each of the above six cases. The computer processor only has to determine which case is present within an input triangle primitive (i.e., which of the six orderings is present) by using a branch condition for each, and then channel processing to that particular specialized routine. In so doing the data does not have to be rearranged to match a particular routine, rather, there is a separate routine for each of the six cases.

Prior Art Process Flow for Triangle and Quadrilateral Rendering

The steps required for a prior art computer graphic processor to render a triangle primitive are illustrated in flow diagrams of FIG. 2(A) and FIG. 2(B). The entire flow illustrated in FIG. 2(A) and FIG. 2(B) is referred to as the 201 flow. The processing starts at block 200 and continues to block 205 where the three vertices of the triangle data structure are received from memory, in fact, the entire primitive data structure including: 1) positional location data (x, y, z) in world coordinate space; 2) color attributes; 3) surface normal data; 4) and other data, is received for each vertex of the primitive into the processor memory. At block 210 the vertices of the primitive are transformed from the world coordinate (x, y, z) space (described from a world reference point) which presents all the environment of the display data stored within the computer system into an eye coordinate space. Eye coordinate space represents the coordinates of the vertices in three dimensional space which is referenced from the point at which the viewer's eye is located and the particular angle of sight employed by the viewer. At block 210 each of the vertices and surface normals associated with the primitive are transformed from the initial world coordinate into the eye coordinate depending on the location and line of sight of the viewing eye in three dimensional space.

Next, the processor reaches the first branch test at block 220 and tests if any vertices are within a clip volume. Very infrequently this process follows the "yes" 220a path during typical process flow and is shown merely to be complete. Block 225 can be viewed as an exception handler. Polygon clipping will be performed within block 225 which is a different process of which the present invention is not concerned. As most likely will be the case, flow of the computer processor will continue to block 230 via condition flow 220b. At block 230, the three dimensional triangle primitive will be "projected" onto a two dimensional viewing screen. That is, at block 230 the primitive will be transformed from the three dimensional eye coordinates (x, y, z) and projected onto the plane of the viewing screen in two dimensions (x, y), see indicator 15 of FIG. 1. These viewing screen coordinates are called screen x and screen y values.

At block 235 the computer processor then performs the comparison functions as described above to determine the particular ordering of the triangle vertices depending on their screen y values. First, vertex 0 is compared to vertex 1 (the 01 compare), then vertex 0 is compared to vertex 2 (the 02 compare), then vertex 1 is compared to vertex 2 (the 12 compare). At the completion of the processing of block 235 the computer processor will know which of the six vertex orderings the data structure of the present triangle primitive contains. Processing of FIG. 2(A) then proceeds to the processing of FIG. 2(B) via block 240. FIG. 2(B) illustrates six separate branching paths formed by five conditional branching paths and one default condition (270). Each of the branching paths leads to a specially tailored process for generating the triangle primitive having a particular vertex ordering according to the y screen value. At block 245, the 2>1>0 condition is checked, and if encountered processing proceeds to block 247 where the vertices are accessed from the computer memory and the specialized process computes the three slopes, the partial derivatives, the sub-pixel corrections, and the initialization points 26 and 27. These processes are accomplished based on the ordering of vertices 2>1>0 with respect to the y screen values.

After the processing of block 247, the computer processor then performs block 248 which loads the determined slopes, partial derivatives, initialization values, and sub-pixel corrections into the specialized scan conversion hardware and enables the hardware to generate and display the pixel pattern representing the triangle primitive. Processing then proceeds to block 285 to either start again with a new triangle primitive or return from flow 201 if called from an outside routine. If the current triangle primitive is not 2>1>0 then the processing continues to block 250 to check for the 1>2>0 condition. If this condition is met then processing continues to block 252 to perform the slope, partial derivative, sub-pixel correction and initializing computations based on this order. Next, at block 253 the hardware is given the data from block 252 to generate and display the triangle primitive and return to block 208 when complete. If the condition at block 250 fails, then processing continues to block 255 where condition 2>0>1 is tested. If this condition is encountered, then block 257 will be executed based on 2>0>1 order and block 258 will generate and display the triangle primitive and return to block 285. If the condition at block 255 fails, then processing continues to block 260 where condition 0>2>1 is tested. If this condition is encountered, then block 262 will be executed based on 0>2>1 order and block 263 will generate and display the triangle primitive and return to block 285. If the condition at block 260 fails, then processing continues to block 265 where condition 1>0>2 is tested. If this condition is encountered, then block 267 will be executed based on 1>0>2 order and block 268 will generate and display the triangle primitive and return to block 285. If block 265 fails then either of two cases is true. First, graphic primitive may contain the order 0>1>2 or second, it may contain equals between all three vertices. In either cases, block 270 is executed to supply the required data to the scan converter hardware at block 280 which generates and displays the triangle on the screen. At block 285 the processing returns to block 200.

It is appreciated that each of the above blocks 247, 252, 257, 262, 267, and 270 of the triangle processing flow 201 perform the exact same computations (slope, sub-pixel correction, partial derivative, and initialization values), but for data structures having different vertex orderings.

The steps required for a computer graphic processor to render a quadrilateral primitive are illustrated in flow diagrams of FIG. 3(A) and FIG. 3(B). As will be shown, quadrilateral primitive is typically split across opposing vertices in order to generate two triangle primitives, each using three vertices of the quadrilateral polygon. Then each of the two triangles is processed similar to the triangle rendering processing blocks 235 to 280 as described above. The flow for the quadrilateral process of the computer processor begins at 300 and flows to 305 where the data structure for the quadrilateral is received into the computer processor memory. This data structure contains, for each of the four vertices, location, color, surface normal, and other information required to render the quadrilateral primitive. At block 310 the quadrilateral vertices and surface normals are transformed from the three dimensional world coordinate system into the eye coordinate system in three dimensions also. Then at block 315 the exception handling quadrilateral clipping branch is tested to see if any polygon clipping is required. If so, then processing continues out of the current flow to block 320 and the present invention is not concerned with this flow. Typically, the flow will go to block 320 because clipping is rare. At block 325 a perspective divide, or projection, is done from the three dimensional eye coordinate scheme into the two dimensional (x, y) screen coordinates of the display plane. This is done for each of the data of the vertices of the quadrilateral including the surface normal vectors.

At block 330, the computer processor computes the dot products of surface normals for vectors 0 and 2 and then the dot product for surface normals for vectors 1 and 3. At block 340 of FIG. 3(B) these values are compared. If the dot product of the surface normals for vectors 0 and 2 is larger then the dot product of the surface normals for vectors 1 and 3 then processing goes to block 365, else it goes to block 345. At block 365 the quadrilateral polygon is split into two triangles across opposing vertices 1 and 3, the first triangle being vectors (0, 1, 3) and the second triangle being vectors (1, 2, 3) of the quadrilateral. At block 370 the triangle rendering flow processing blocks 235–280 are performed for the first triangle (0, 1, 3) and then processing will return to block 370. Next, at block 380, the triangle rendering flow blocks 235–280 are performed on the second triangle (1, 2, 3) and processing returns to block 380. After these flows, block 385 readies the processor for the next quadrilateral data structure.

Notice that for each triangle processed there were six separate branching conditions tested for each of the possible vertex orderings as described within flows 235–280. Therefore, for each quadrilateral primitive there are twelve branching conditions tested by the program flow and six separate specialized processor routines that will be performed.

At block 345 the quadrilateral is split across opposing vertices 0 and 2 instead of 1 and 3. Therefore, triangle (0, 1, 2) is created and triangle (0, 2, 3) is created. At block 350, the first triangle is sent through process flow blocks 235–280 and at block 360 the second triangle is sent through process flow blocks 235–280. At block 385 the computer processor readies for the next quadrilateral data structure. Again, for each quadrilateral there are twelve branching conditions tested by the program flow and six separate specialized processor routines that will be performed.

Objects of the Present Invention

Computer graphics systems implementing the above process flows for the triangle and quadrilateral have traditionally constructed vertex structures in a single memory per processor. With a single memory, a SISD (single processor) or a MIMD (multiple processor) follows the flow processing of the triangle and quadrilateral exactly. However, SISD processor environments do not offer an advantageously large amount of processing power because they have only one processor. While flexible, MIMD (Multiple Instruction Multiple Data) processor environments are often very complex and costly to implement and maintain. With a single memory, SIMD processors (multiple processors single instruction) use indirect address through address registers to shorten the number of execution states spend out of lockstep after the quadrilateral split compare branches (block 340) and the screen space y compare branches. However, single memory SIMD (Single Instruction Multiple Data) environments do not offer advantageous processing capability because the indirection by addressing consumes too much processing time.

It would be advantageous to have a system capable of operating within a multiple memory (per processor) SIMD environment. The present invention offers such an environment and solution by providing an indirection mechanism that indirects across multiple busses between multiple memories allowing a geometric primitive's data structure to be spread across multiple memories in a multi-memory/ multi-bus SIMD environment.

It would be advantageous to eliminate the branching conditions required to determine and route the vertex data to a particular specialized routine. These process branchings are found in the triangle and the quadrilateral rendering process flows. The reasons for these multiple paths and routines derives from the slope and sub-pixel calculations that must be done to calculate the appropriate values for loading the hardware scan converter. These calculations are dependent on the relative ordering of the vertices in screen coordinate space In the case of the quadrilateral split calculations, they are dependent on the inter-relationship of vertex normals, and are independent of the ordering of vertices in processor memory. The present invention eliminates the branchings encountered in the flow diagram 201 (i.e., branchings 245, 250, 255, 260, and 265) resulting in six different flow paths (per triangle primitive).

It would also be advantageous to provide only one specialized routine to perform the processing for all vertex ordering such that multiple independent graphic processors could operate in parallel on this single specialized routine. It would be advantageous to provide the specialized capability above in a multiple memory SIMD environment. The present invention offers such a solution. In a multiple-processor environment capable of executing different instruction code streams simultaneously (MIMD), each processor can flow a different instruction stream of the six flows illustrated in FIG. 2(B). However, in a SIMD environment (which offers reduced cost per processing unit), each processor of the multi-processor environment must execute the same instruction stream simultaneously. The present invention allows such capability.

Accordingly, it is an object of the present invention to eliminate the branching conditions required for each of the six possible vertex orderings for each triangle in both the rendering process for a triangle and the rendering process for a quadrilateral primitive. It is further an object of the present invention to allow the computer processor to operate with only one specialized processor to perform slope, partial derivative and sub-pixel correction calculations. It is further an object of the present invention to utilize the above features within a multiple memory per processor multiprocessor environment utilizing SIMD technology (Single Instruction Multiple Data). It is an object of the present invention to provide an efficient and high processing power computer graphic system that simultaneously processes several geometric primitives utilizing multiple SIMD technology processors. These and other objects of the present invention not specifically mentioned herein will become clear in light of discussions of the present invention to follow.

SUMMARY OF THE INVENTION

Embodiments of the present invention include an electronic logic and computer implemented apparatus and method for accessing graphic geometric data within a computer display system utilizing an SIMD environment. The present invention spreads the vertex data structure of geometric primitives across multiple memories allowing much higher bandwidth access into the data structure for greater performance. The present invention eliminates branches from the processing of triangle and quadrilateral primitives allowing full utilization of SIMD processors. The present invention utilizes an indirection circuit and software to control the order of coupling of these memory units to the inputs of specialized graphic processors. Therefore, the indirection mechanism allows a geometric data structure to be spread across multiple memories in a multi-memory/ multi-bus environment with indirection across these multiple busses and memories. The present invention provides full utilization of a SIMD processor processing triangles or quadrilaterals and performs splitting of quads and ordering of triangle vertices in hardware.

More specifically, embodiments of the present invention include a computer implemented apparatus and method within a specialized processor unit of a plurality of processor units coupled together utilizing SIMD technology, the apparatus and method for rendering a geometric primitive which is composed of information associated with a plurality of vertices, the apparatus and method comprising: first processing means for determining slopes based on the information associated with the plurality of vertices of the geometric primitive, each slope associated with an edge of the geometric primitive, the first processing means for processing the information associated with the plurality of vertices in a predetermined order; a plurality of memory means for storing the information associated with the plurality of vertices, each memory means for storing information associated with a separate vertex of the geometric primitive; and multiplexing means coupled to the plurality of memory means and coupled to the first processing means for intercoupling each memory means to the first processing means so that the information associated with the plurality of vertices is supplied to the first processing means by the plurality of memory means in the predetermined order.

Embodiments of the present invention include the apparatus as described above and further including scan conversion means for generating a pixel pattern of the geometric primitive based on the slopes generated for each edge of the geometric primitive by the first processing means, the scan conversion means coupled to the first processing means.

Embodiments of the present further include an apparatus for rendering a geometric primitive as described above wherein the geometric primitive is a triangle having three vertices and wherein the predetermined order is based on a screen coordinate value associated with each vertex of the three vertices and further comprising: second processing means for generating comparison results of the screen coordinate value between pairs of vertices of the three vertices; and third processing means for ordering the three vertices of the triangle primitive according to the screen coordinate value, the third processing means coupled to receive the comparison results from the second processing means and the third processing means communicatively coupled to said multiplexing means.

BRIEF DESCRIPTION OF THE DRAWINGS

FIG. 2(A) and FIG. 2(B) illustrate the processing steps of the prior art for rendering a triangle primitive including six separate conditional paths and six separate specialized routines.

FIG. 3(A) and FIG. 3(B) illustrate the processing steps of the prior art for rendering a quadrilateral primitive including 12 separate conditional paths and six separate specialized routines.

FIG. 10(B) is a complete logic mapping diagram of the present invention illustrating all input and outputs for the combinational logic of the indirection mechanism for the both triangle and quadrilateral state machine selection mode.

DETAILED DESCRIPTION OF THE INVENTION

The present invention includes an apparatus and method within a high performance computer graphics system for providing an indirection mechanism to specifically route data associated with each vertex of a geometric primitive so that a single specialized processor and routine for slope and sub-pixel calculations can be utilized to process the data structure of the geometric primitive. Using the single specialized processor and routine, multiple processors can be configured using SIMD technology that each simultaneously execute this specialized routine to allow simultaneous processing of several geometric primitives. The present invention eliminates the need for the six branching paths and six different routines required for these branching paths by implementing, for each processor, an indirection mechanism coupled to several memories (per processor) which contain the data structure for the geometric primitive. Since different processing paths are not required, the present invention is advantageously implemented in an environment utilizing SIMD processing technology and multiple processors each having the ability to process a separate geometric primitive. In so doing, several graphic primitives can be simultaneously rendered in an efficient manner eliminating the conditional branchings of prior art graphic systems.

Figure 2A:
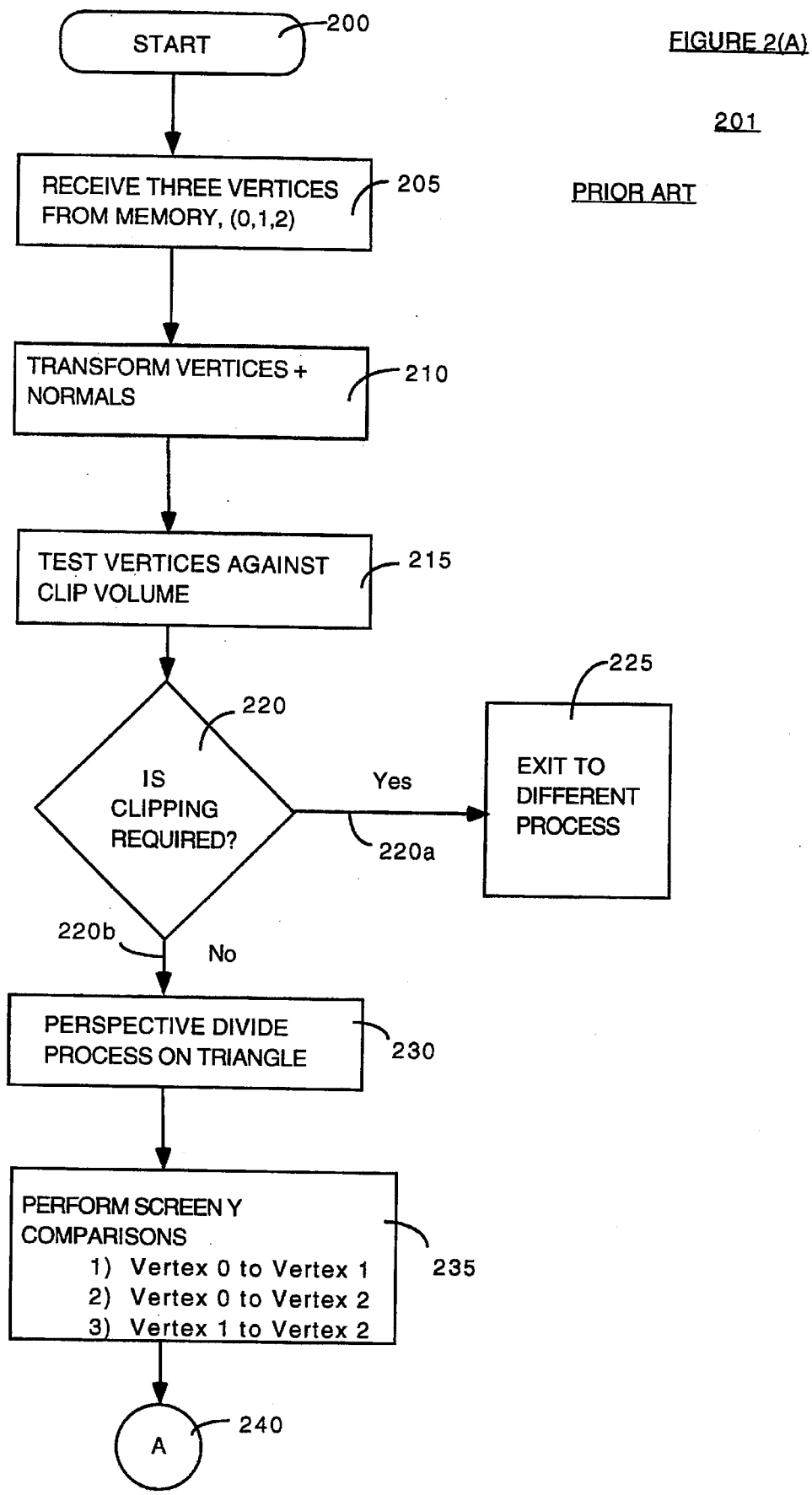
Figure 3B:
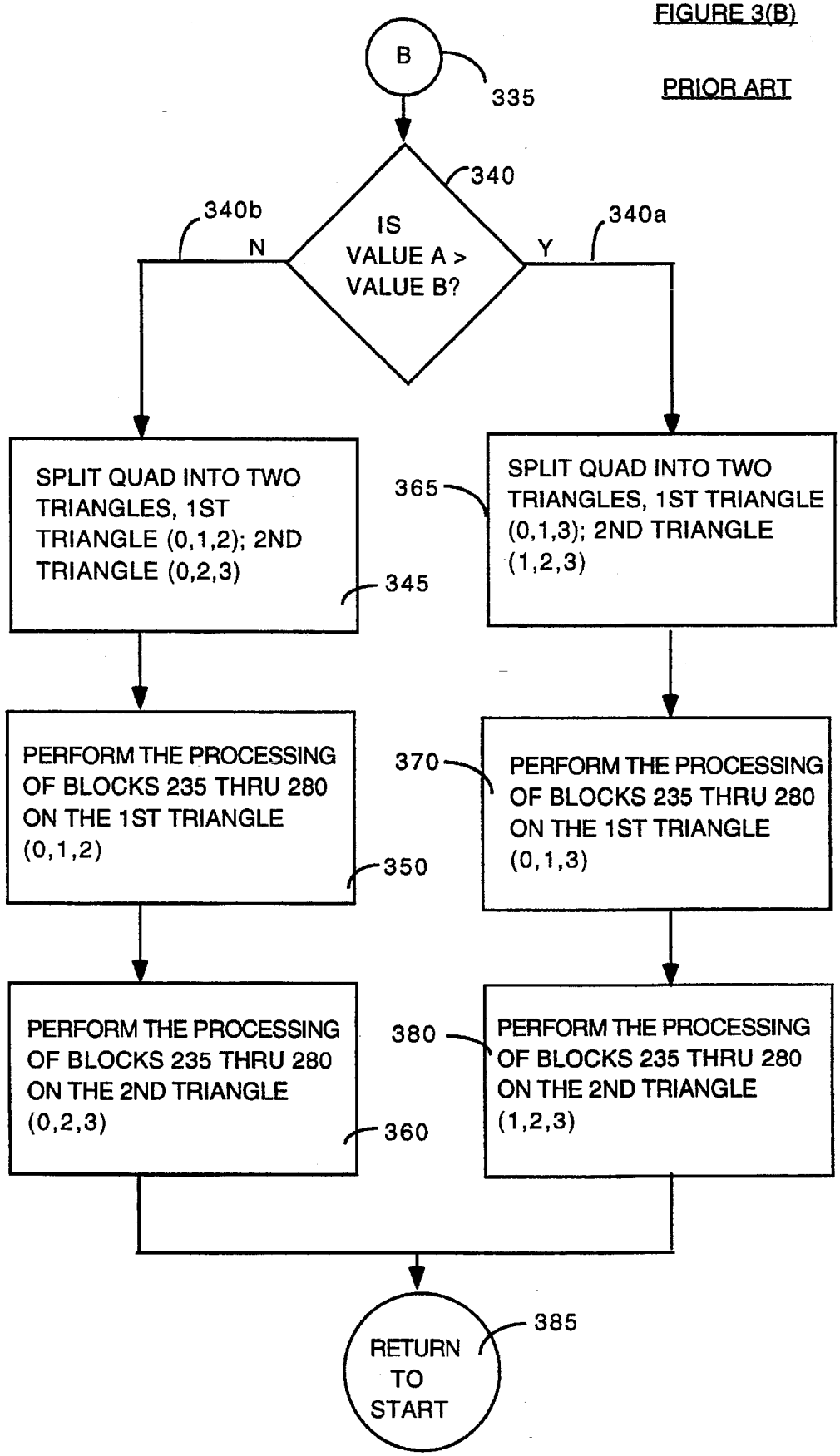

The preferred embodiment of the present invention makes use of the fact that the process flows 247, 252, 257, 262, 267, and 270 of FIG. 2(B) have identical computations down the separate branch paths (symmetric paths), however, unique to each branch being the ordering in which the vertex data structure is traversed, or indexed for a geometric primitive. The preferred embodiment of the present invention stores the vertex data structure of a geometric primitive split between as many memory units as there are vertices, with each memory unit holding the parameter values for a single vertex. It is appreciated that this is done for each processor of the multiprocessor SIMD environment. The vertex data structure is constructed by each processor and tied together in SIMD lockstep in the same fashion: parameters for the first vertex received go into a first memory, vertex parameters for a second vertex go into a second memory, . . . , and vertex parameters for the last vertex (3 or 4) go into the last memory (third or fourth) depending whether a triangle or quadrilateral primitive is utilized by the present invention.

The present invention offers an indirection mechanism that indirects across multiple busses into multiple memories per processor allowing a geometric primitive's data structure to be spread across multiple memories in a multi-memory/multi-bus environment. The mechanism provides much higher bandwidth into a data structure for this reason. The present invention provides processing of triangle and quadrilateral graphic primitives without branches and thus, in a SIMD environment with multiple memories, the present invention provides full utilization of a SIMD multiprocessor processing triangles and quadrilateral primitives. The present invention performs the splitting of quadrilaterals and ordering of the triangle vertices in hardware via state machines.

In the following detailed description of the present invention numerous specific details are set forth in order to provide a thorough understanding of the present invention. However, it will be obvious to one skilled in the art that the present invention may be practiced without these specific details. In other instances well known methods, routines, procedures, and components have not been described in detail as not to unnecessarily obscure aspects of the present invention.

Computer Graphics Processor and System

Throughout this discussion of the present invention it will be discussed that computer processors perform certain functions, generate outputs, examine data, determine results and perform procedures and process blocks or steps. It is appreciated that what is meant by this language, or similar language, is that an electronic or logic oriented computer system is executing program instructions that perform the above operations and functions to arrive at logical results or that specialized hardware (such as a programmed state machine) is performing these steps or procedures. The results and processing components of the present invention are physical quantities existing within the computer graphics system, which may be driven or instructed by program codes (instructions). In other discussions of the present invention, it may be clear that such computer processing flow has been modified to include specially tailored hardware processors and state machines, used for high speed calculations, that have been implemented in conjunction with the computer implemented graphics system.

Figure 4:
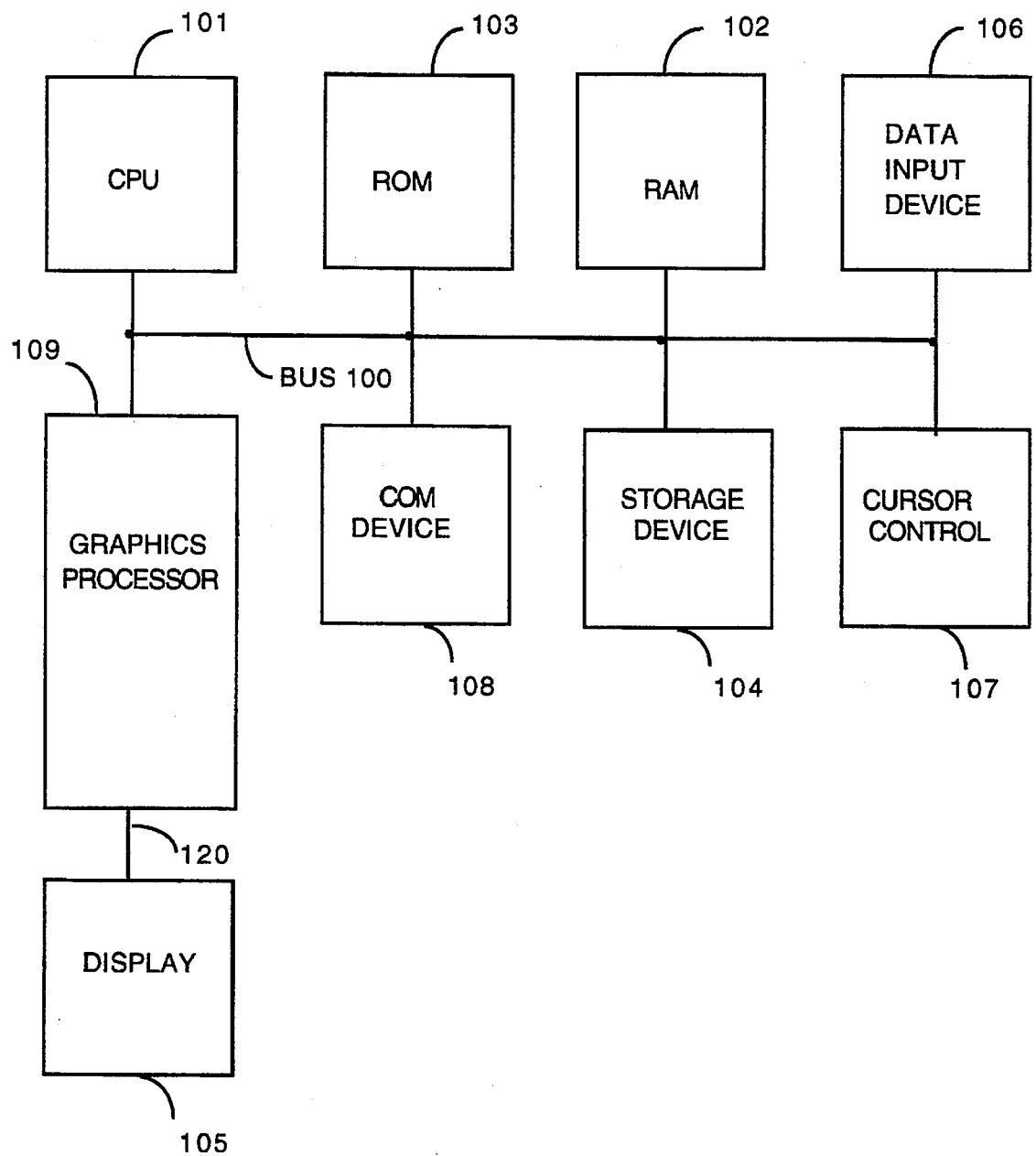
FIG. 4 is an block diagram illustration of computer graphics processing system of the present invention.

A discussion of a typical computer graphics system capable of executing program codes and generating displayable results to a user or viewer is described in FIG. 4. In general, computer, or electronic logic, implemented graphic display processors used by the preferred embodiment of the present invention as illustrated in block diagram format in FIG. 4. Such graphic display systems comprise a bus 100 for communicating information, such as geometric primitive data structures, a central processor 101 coupled with the bus for processing information and instructions (a specific instruction bus 402 is also implemented within bus 100), a random access memory 102 coupled with the bus 100 for storing information (such as geometric primitive data structures) and instructions for the central processor 101, a read only memory 103 coupled with the bus 100 for storing static information and instructions for the processor 101, a data storage device 104 such as a magnetic or optical disk and disk drive coupled with the bus 100 for storing information and instructions, a graphics processor 109 coupled to the bus 100 and a display system 105 coupled to the graphics processor 109 for displaying information and graphic primitives in displayable pixel patterns to the computer user, an alphanumeric input device 106 including alphanumeric and function keys coupled to the bus 100 for communicating information and command selections to the central processor 101, a cursor control device 107 coupled to the bus for communicating user input information and command selections to the central processor 101, and a signal generating device 108 coupled to the bus 100 for communicating command selections to the processor 101.

It is appreciated that within the high performance computer graphics system of the present invention there are multiple processors within the graphics processor 109 that each act to render a separate geometric primitive. Each of the separate processors are referred to within this discussion as processors or "geometry engines." The overall system of the present invention illustrating the SIMD processors will be discussed further below.

The display device and system 105 of FIG. 4 utilized with the computer system and the present invention includes the display device used to display the graphic primitives as well as the display generation circuitry and display buffers (frame buffer memories) required to combine data supplied from hardware scan converter units. The display device may be a liquid crystal device, cathode ray tube, or other display device suitable for creating graphic images and alphanumeric characters recognizable to the user. The display device 105 is coupled to the graphics processor via bus 120 which supplies pixel patterns to the display device 105. The cursor control device 107 allows the computer user to dynamically signal the two dimensional movement of a visible symbol (pointer) on a display screen of the display device 105 for selection of which geometric primitives will be displayed on the display screen. Many implementations of the cursor control device are known in the art including a trackball, mouse, joystick or special keys on the alphanumeric input device 105 capable of signaling movement of a given direction or manner of displacement. It is to be appreciated that the cursor means 107 also may be directed and/or activated via input from the keyboard using special keys and key sequence commands.

Multiprocessing Capability of the Graphics Processor 109

Graphics processors 109 have very high computational, and therefore memory, bandwidth requirements due to the large amount of information that is needed to be processed to satisfy the visual accurateness and motion speed requirements of the human eye (or of the human eye integration mechanism). Graphic processors typically have the highest computational and memory bandwidths of any of the subsystems of a computer system. The high memory bandwidth is required for high bandwidth access into the triangle/quadrilateral vertex data structure mentioned above. The bandwidth attainable from a single memory is insufficient for graphic processing capabilities of the present invention, therefore, data structures of the geometric primitives are spread across multiple memories (per processor) according to the present invention.

Further, the processing capability of a single processor is not able to deliver the processing capacity required for operation within the present invention. Therefore, within the graphics processor 109 the present invention advantageously utilizes multiple processors 401a–401d which are tied together executing the same instruction stream (SIMD). The SIMD approach is utilized within the present invention because the SIMD technology offers the lowest cost per area per power solution for processes that can tolerate operating in lockstep while operating with the same power as a MIMD system. Lockstep is defined as the condition when all processors are actively executing the same instruction stream and are not idle. It is appreciated that in a SIMD environment utilizing multiple memories, each processor of the system receives and executes the same instruction stream from the process flow used to render a geometric primitive.

According to the present invention, several processors ("geometry engines") executing in SIMD are each passed a quadrilateral primitive or a triangle primitive and therefore several geometric primitives can be generated or rendered at once. It is appreciated that all processors receive either quadrilateral primitives or triangle primitives per rendering sequence but not a mixture of both. Therefore, four triangles or four quadrilaterals are rendered simultaneously. For a SIMD multi-processor environment executing only a single instruction stream for each processor, the type of conditional branching shown in flow 201 is not advantageous because each processor of the SIMD multi-processing environment is not allowed to traverse different branches, but must each execute the same single instruction stream to remain in execution lockstep. In a SIMD environment, the graphic processor loses multi-processor advantages and efficiency when executing out of lockstep fashion.

Overall Multi-Processor Multiple Memory SIMD Environment

Figure 5:
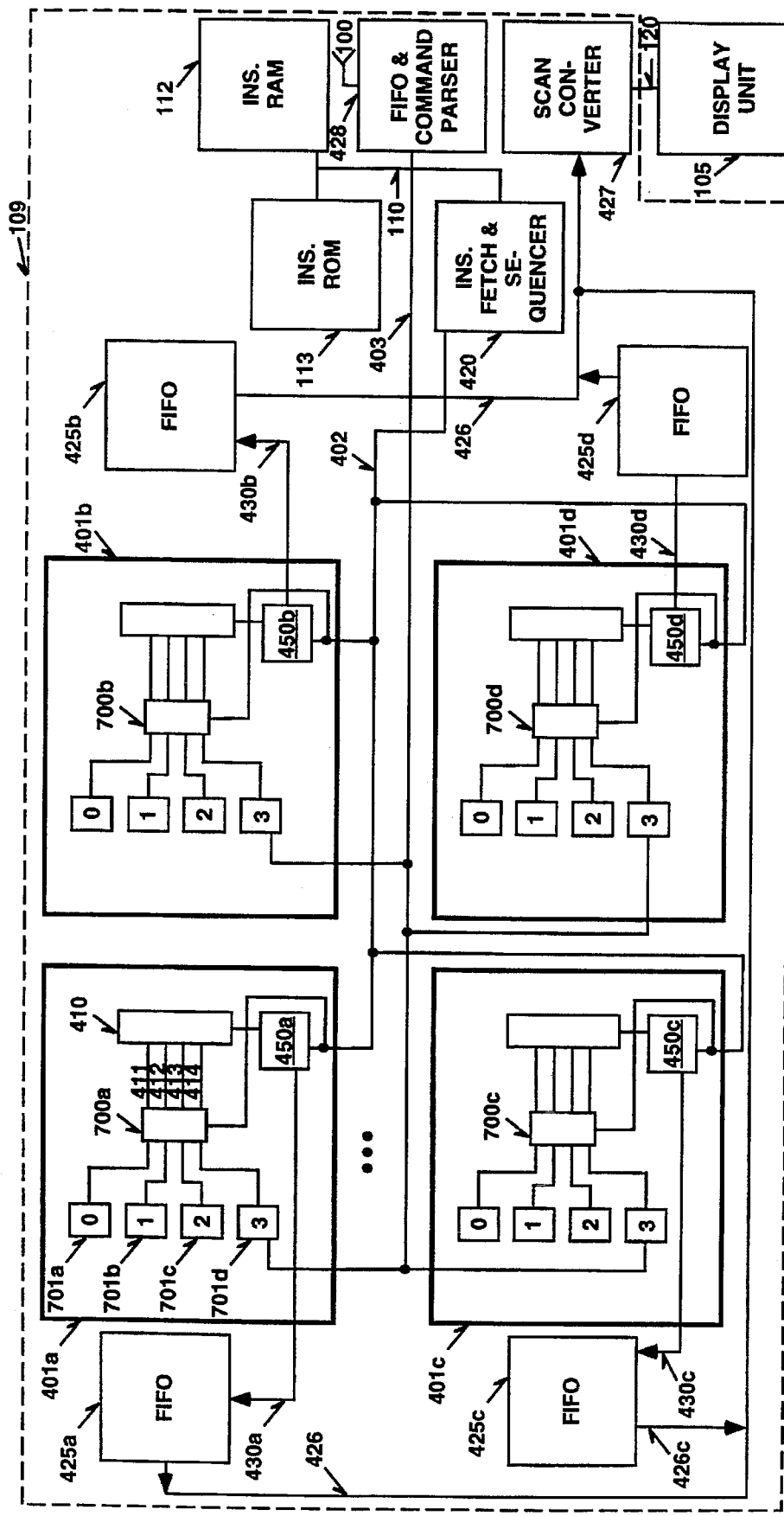
FIG. 5 is a detailed block diagram of the specialized graphics processors of the SIMD environment of the present invention and specifically illustrates the four specialized graphics processors operating in parallel from a single instruction bus.

FIG. 5 illustrates a more detailed design of the graphics processor 109 of FIG. 4. Also shown for clarity within FIG. 5 is the display system 105 coupled via bus 120. FIG. 5 illustrates the overall SIMD multi-processor environment of the preferred embodiment of the present invention. In a SIMD environment, each of the four processors (geometry engines) 401a–401d receives the same instruction bus 402 which is part of the overall system bus 100. There are four separate processors 401a–401d which act to perform the slope, partial derivative, initial point calculations, and subpixel correction calculations a particular geometric primitive fed to each processor. The present invention is described in terms of four such processors, however, it is appreciated that the present invention may advantageously be extended, consistent with this discussion, to include more or less than four processors, as FIG. 5 indicates. Other embodiments of the present invention may include 8 or more processors operating in parallel or only two geometric engines operating simultaneously. It is appreciated that the bus 100 couples the components of graphics processor 109 via the FIFO and command parser block 428.

Within each processor 401a to 401d of the present invention is located several important components. The details of processor 401a are described as an illustration of each of the four processors but is understood that each of the other three processors contain equivalent structures. Within processor 401a is located four random access memory units 701a–701d and each of the memory units is coupled to an indirection circuit 700a of the present invention via an address/data bus. Each memory unit of the present invention processor will contain data associated with a particular vertex of a data structure of a graphic primitive. That is, memory 701a will hold the data for vertex 0 (i.e., location, color, surface normal, attributes), memory 701b will hold data for vertex 1, memory 701c will hold data for vertex 2. If the graphic primitive is a quadrilateral having four vertices, then memory 701d will hold the data for vertex 4 of the primitive that will be rendered by that processor. The indirection circuit 700a–700d of each processor of the present invention is coupled via four separate output busses 411–414 (containing both address and data lines) to a processor mathematical unit 410 capable of performing arithmetic functions such as addition, subtraction, multiplication and division. The mathematical unit 410 is also coupled to an instruction decoder 450a which provides control and direction for the entire processor 401a.

Each of the instruction decoders 450a–450d for each processor is coupled to a common instruction bus 402 which provides the current instruction of the geometric primitive rendering process which is stored in an instruction RAM 112 and/or an instruction ROM 113. Instructions of the rendering process are supplied by a common instruction fetch and sequencing unit 420 as illustrated. The instruction sequencing unit 420 is coupled to a bus 110 which is also coupled to instruction RAM 112 and instruction ROM 113. Instructions of the rendering routine that will be simultaneously fed to all processors 401a–401d are stored in the instruction memories 112, 113 read via sequencer 420 and supplied over bus 402 to each instruction decoder 450a–450d.

Each of the processors 401a–401d is also coupled to its own FIFO unit 425a–425d (respectively) via busses 430a–430d (respectively) which are each coupled via bus 426 to a common scan converter hardware unit 427. The FIFO for each processor holds the slopes, partial derivatives, initial point calculations and sub-pixel correction parameters for each primitive processed by that processor. As a result of this design of the present invention, each of the processors may treat their associated FIFO unit as a virtual scan conversion unit. The scan converter 427 is responsible for reading each of the FIFOs 425a–425d in sequence across bus 426 and generating a displayable pixel pattern for each of the FIFO contents. These pixel patterns are combined by the scan converter and then sent onto the display system 105 over line 120. The display system 105 will integrate the output of the hardware scan converter 427 into a display frame buffer in memory within the display system 105. The display frame buffer will then be sent to the display device within unit 105 for visualization to the use of the computer graphics system.

Any of the well known scan converter hardware units can be employed by the present invention. The scan converter 427 must be able to accept the calculated slopes, partial derivatives, initial values, and sub-pixel correction values and generate, as a result, a pixel pattern of the geometric primitive for display on the display device. An illustrative scan conversion system is described on pages 398–399 of Newman and Sproull, *Principles of Interactive Computer Graphics*, McGraw Hill, 1979. Also, a basic polygon fill process is described in chapter 3.6 of *Computer Graphics Principles and Practice*, second edition (1990), by James D. Foley, Andries van Dam, et al., from Addison-Wesley Publishing, referenced at pages 92 to 99.

The instruction sequencer unit 420 fetches the next instruction in the process flow of the present invention that generates or renders the geometric primitives. Each instruction is passed simultaneously to each and every instruction decoder unit 450a–450d within the processors 401a–401d over the common instruction bus 402. Therefore, each processor 401a–401d is executing the same instruction at the same time on the same clock tick within the process flow and each processor is in lockstep during the rendering of the geometric primitives.

A memory unit 701a of each of the processors 401a–401d is coupled to a data bus 403 that has the bandwidth of separately supplying a geometric primitive data structure to each of the four processors simultaneously. The data structures for geometric primitives are supplied to the memory units via a FIFO and command parser unit 428 which is directly coupled to bus 100 of the graphics system. The command parser unit 428 acts to traffic the data structures to the appropriate processors 401a–401d. Therefore, in overall sequence, the computer graphic system supplies geometric primitives to the FIFO and command parser unit 428 via bus 100. A set of four of these primitives are transferred via data bus 403 to the processors so that each processor gets a data structure. Since four geometric primitives are rendered simultaneously, each processor will receive every fourth primitive within the primitives stored within the FIFO unit 428.

When a data structure is initially placed into a particular processor, the entire data structure for all vertices arrives first in a memory unit 701a for each processor. Then, the instruction decoder for each processor channels that data structure across each of the other memories such that data associated with each vertex of the data structure resides in a separate memory unit 701a–701d. Therefore, the above mechanism is contemplated in discussions to follow that describe loading vertex data within memory units 701a–701d for each processor.

Overall Operation of the Present Invention

The preferred embodiment of the present invention performs the following overall operation. During execution of particular primitive rendering process, which process flow is stored in instruction RAM 112 and/or ROM 113, several geometric primitives will have to be rendered onto the display screen 105. Of these primitives, four separate primitives will be loaded, one each, to a separate processor 401a–401d into the memory units 701a–701d for each processor. For instance, processor 401a will receive the first primitive, 401b the next, 401c the third and 401d the last. These data structures will be fed from the FIFO unit 428 over a data bus 403 into the respective processors. The instruction sequencer unit 420 will then execute the rendering code, common to all processors, to render each of the primitives simultaneously. Each of the indirection circuits 700a–700d for each processor will multiplex and thus order the vertex data stored in the memories 701a–701d over the busses 411–414. It is appreciated that the central processor 101 originally passes the primitives to the FIFO unit 428.

Since the indirection circuit 700a for each processor performs the multiplexing to order the vertex data, none of the six branching conditions or paths of the prior art is required. Because none of the branching conditions are needed, the same program code can operate on each of the six different vertex ordering possibilities for a triangle primitive, i.e., 0>1>2, 0>2>1, 1>0>2, 1>2>0, 2>0>1, or 2>1>0. Since one program code will suffice, all of the SIMD processors 401a–401d may share the same instruction bus 402. For instance with reference to a triangle primitive in processor 401a, once the processor 410 performs the comparison instructions on the three vertices of the triangle, the indirection circuit determines the particular vertex ordering for that primitive of the six vertex ordering above. The comparison flags are passed to the indirection circuit 700a via line 751. Line 751 communicates various compare flags, enable signals, and clear signal from the mathematical unit 410 and from the instruction decoder unit 450a; these are referenced by 751a–751g (of FIG. 6). Indirection circuit 700a will then multiplex the address/data busses coupling the memories 701a–701d to the address/data busses 411–414 in a particular order that corresponds to the specific vertex ordering determined. Since the memories are accessed via busses 411–414 depending on the ordering of the vertices expected by the specialized rendering code executed by unit 410 and 450a, there is no need for six separate routines to process the slopes, partial derivatives and sub-pixel corrections for this primitive. It is appreciated that the branching conditions used in the prior art are substituted by the indirection circuits 700a–d of the preferred embodiment of the present invention allowing the four processors 401a–401d to execute in SIMD fashion using multiple memories.

Therefore, irrespective of the vertex ordering (by y-screen value) of the four primitives loaded into each processor 401a–401d, the same instruction code can be utilized to calculate the slopes, partial derivatives, and sub-pixel correction factors for each primitive. Therefore, four primitives can be rendered at the same time, during the execution of the same program code, by the four processors 401a–401d. Also, it is appreciated that the scan converter hardware unit 427 will operate on the FIFO units 425a–425d to generate the four pixel patterns, one for each primitive processed by the processors 401a–401d. These patterns are sent to the frame buffer within the display system 105 for combining and display on the display device. This process is repeated for another set of four primitives until all of the required primitives are rendered.

Using the above procedure, SIMD architecture utilizing data structures for a primitive that are spread across multiple memories is used by the present invention to efficiently render geometric primitives on a display system 105. Since the indirection circuits 700a–700d eliminate the need for separate process routines for slope determination, sub-pixel correction, and partial derivative generation, each of the four processors 401a–401d can operate in lockstep, executing the same instructions on a separate graphic primitive loaded into each processor. The above is presented as an overview of the processes of the present invention. Aspects of the present invention not described in detail above will be described further in discussions to follow.

Indirection Circuits 700a–700d of the Present Invention

Figure 6:
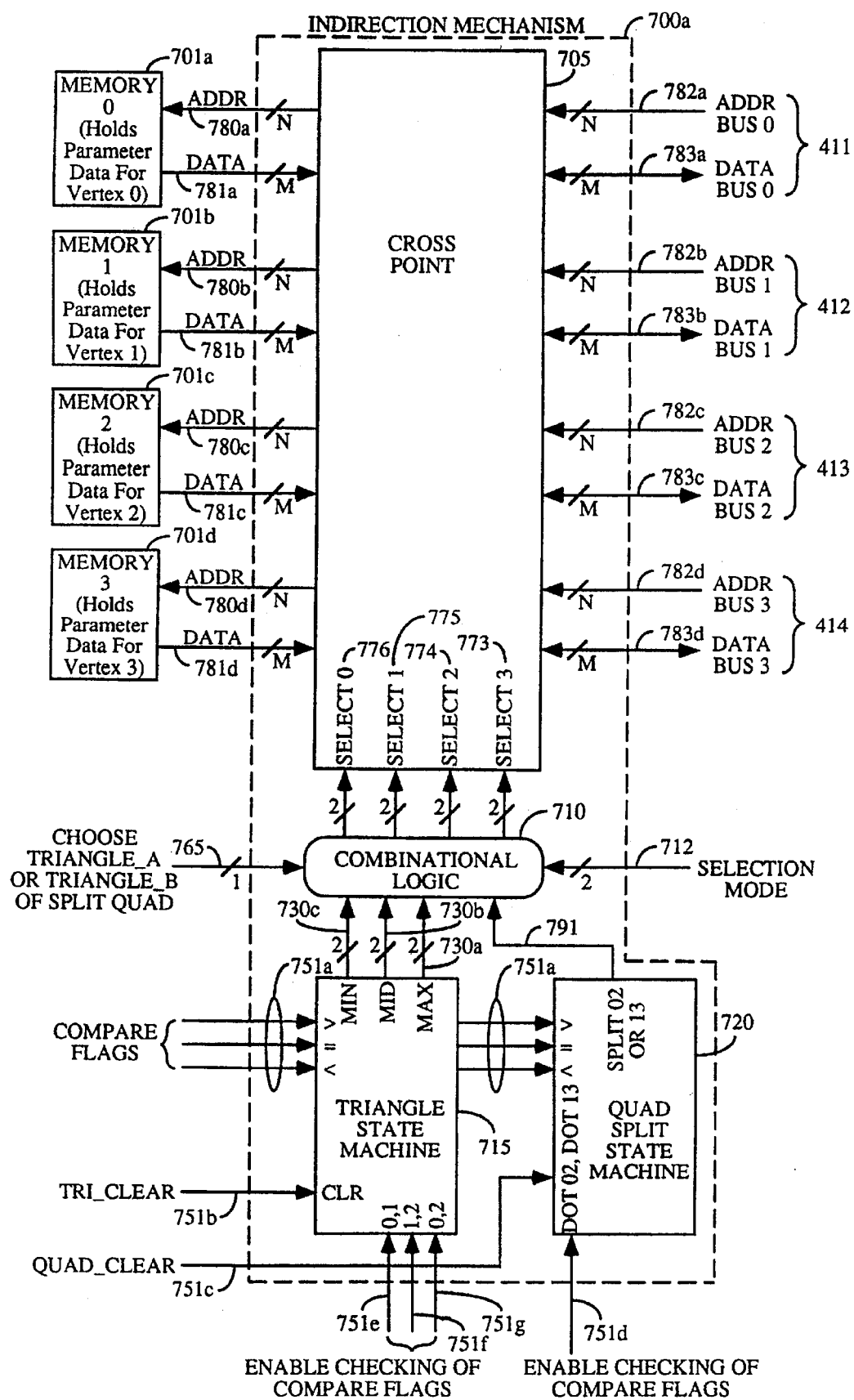
FIG. 6 is a detailed view of the indirection mechanism of the present invention.

As shown in FIG. 5, there is a separate indirection circuit 700a–700d for each processor 401a–401d. The details of the indirection circuit 700a will be described herein. It is appreciated that each other indirection circuit 700b–700d is identical in design, logic and function. Refer to FIG. 6 which illustrates the indirection circuit 700a. With each indirection circuit 700a–700d there is a cross point multiplexer circuit 705, a combinational logic unit 710, a triangle state machine 715 and a quadrilateral split state machine 720. The indirection mechanism 700a is connected to the mathematical unit 410 via four busses 411–414. There are four memory units 701a to 701d connected to the indirection mechanism 700a for respectively containing data for each vertex, vertex0 to vertex3 of a geometric primitive's data structure. The data structure for a primitive is loaded into these four memories, vertex0 data is placed in memory 701a, vertex1 data into memory 701b, vertex2 data into memory 701c, vertex3 data into memory 701d. Address busses 780a, 780b, 780c, and 780d respectively couple memories 701a, 701b, 701c, and 701d into a cross point multiplexer circuit 705. Data busses 781a, 781b, 781c, and 781d respectively couple memories 701a, 701b, 701c, and 701d to the cross point circuit 705 so that data flow is allowed to and from the cross point circuit 705 and the memories 701a–701d. It is appreciated that the signal lines 765 and 712 originate from the instruction decoder units 450a–450d of each processor.

The cross point circuit 705 will perform the vertex ordering of the vertex data stored within the four memories consistent with the ordering expected by the mathematical unit 410 (not shown in FIG. 6). The cross point circuit 705 is coupled to the mathematical unit 410 of the processor 401a via four separate address/data busses 411–414. Bus 411 is composed of input address bus0 782a and an input/output data bus0 783a. Bus 412 is composed of input address bus1 782b and an input/output data bus1 783b. Bus 413 is composed of input address bus2 782c and an input/output data bus2 783c. Bus 414 is composed of input address bus3 782d and an input/output data bus3 783d. During operation of the primitive rending processing, using the cross point circuit 705, a specific memory of memories 701a–701d will be independently coupled (cross connected) to a specific bus of the address/data busses 411–414 depending on the values of four selection lines 3-0 which are 773, 774, 775 and 776 respectively. These four selection lines are generated by a combinational logic unit 710, which may be implemented by a logical programmable read only memory or a PAL.

During rendering of a primitive, according to the instructions of the rendering process, mathematical unit 410 associated with the processor 401a processes the vertices of the primitive and expects the minimum y screen vertex data on bus 411, the middle y screen vertex data on bus 412, and the maximum y screen vertex data on bus 413. Of course, any ordering of the above busses and y screen values could be adopted by the present invention (i.e., ymax on 411, ymid on 412, and ymin on 413), so long as the remainder of the indirection circuit 700a for this processor 401a followed this pattern.

It is appreciated that inputs to the indirection mechanism 765 (triangle select), 712 (mode select), 751b (triangle clear), 751c (quadrilateral clear), enable inputs 751e, 751g, and 751f for the triangle state machine, and enable input 751d for the quadrilateral state machine are generated by the instruction decoder 450a of each processor. Further, inputs 751a (compare flags) are generated by the mathematical unit 410 of each processor.

State Machines 715 and 720 of the Present Invention

Two hardware state machines 715 and 720 of the present invention provide inputs to control the cross point mapping selections 773–776 via a specific combinational logic unit 710. The triangle state machine 715 is a hardware logic implemented state machine and receives three inputs 751a from the (>, <, =) flags of the processor mathematical unit 410, as well as three enable signals 751e, 751f, and 751g from the instruction decoder unit 450a of the processor 401a. The triangle state machine also receives a triangle clear (tri_clear) or reset signal 751b from the instruction decoder unit 450a. Triangle state machine 715 determines which of three vertices (0, 1, 2) of a triangle primitive has the maximum y screen value, the middle y screen value, and the minimum y screen value based on the results of the comparison flag signals 751a. The vertex having the maximum y screen value is signaled over the two lines 730a, the vertex having the middle y coordinate is signaled over the two lines 730b and lastly the vertex having the minimum y coordinate is signaled over the two lines 730c. These six lines (two lines per vertex) 730a–730c are fed into the combinational logic 710.

It is appreciated that the triangle state machine 715 does not perform the actual y coordinate comparison of the vertices of the current triangle primitive. Rather, the instruction decoder unit 450a–450d of each microprocessor 401a–401d performs these y coordinate comparisons by first checking: 1) whether the y coordinate value of vertex0 is greater than vertex1; then 2) whether the y coordinate value of vertex1 is greater than vertex2; and finally 3) whether the y coordinate value of vertex0 is greater than vertex2. While the processor 401a is performing one of the above comparisons, it asserts a corresponding enable signal over one of the lines 751e, 751f, or 751f. While performing the first comparison, line 751e is asserted, during the second comparison, line 751f is asserted and lastly while performing the last comparison, line 751g is asserted. While an enable signal is asserted, and after the completion of a comparison function, the mathematical unit 410 associated with each microprocessor outputs a comparison flag, either >, < or = which is fed via lines 751a and latched into the triangle state machine 715 when an enable signal is asserted. Therefore, the triangle state machine is told which vertex pair is currently being compared by the processor 401a (via lines 751e, 751f, and 751g) and the result of that comparison via flag lines (751a). By successively enabling the enable lines and outputting the corresponding comparison result via lines 751a, the processor 401a allows the triangle state machine to determine which vertex holds the ymax value, the ymid value and the ymin value. The indicators or pointers for these vertices are output via lines 730a–730c respectively. Note that each of the indicator (pointer) lines 730a–730c are two lines wide and therefore each can differentiate between four vertices. Upon assertion of the triangle clear signal 751b, the triangle state machine 715 is reset.

Table I below illustrates the inputs of the compare flags 751 and the values of the enable checking lines 751e, 751f, and 751g, respectively, and the possible outputs resulting on the ymax 730a, the ymid 730b, and the ymin 730c lines of the triangle state machine. Notice the sequencing of the enable checking follows the computation and generation of results. (by the compare flags) of the comparison checks of these vertex pairs by the processor 401a. These comparisons for the vertex pairs can be done in any order as long as the enable flag associated with each comparison pair is asserted after that comparison is processed by the processor 401a. In Table I below, the comparison results are generated according to the order vertices 0,1 then vertices 1,2 and lastly vertices 0,2. In the case where two or more vertices of a triangle primitive are equal, the triangle state machine performs the following process. If the ymid value equals the ymax value, then either condition (ymax>ymid>ymin) or condition (ymid>ymax>ymin) may be used. If the ymid value equals the ymin value, then either condition (ymax>ymid>ymin) or the condition (ymax>ymin>ymid) may be used. When all three vertices are equal then the state machine 715 may output any of the six orderings. It is appreciated that the triangle state machine 715 can be implemented according to the input and output map of Table I; reading the table downward represents the sequence the inputs are received.

TABLE I

| Input Compare Flags | | | Input Enable Checking | | | Output Pointers |
|---|---|---|---|---|---|---|
| > | = | < | 0,1 | 1,2 | 0,2 | (max, mid, min) |
| 1 | 0 | 0 | 1 | 0 | 0 | n/a |
| 1 | 0 | 0 | 0 | 1 | 0 | n/a |
| 1 | 0 | 0 | 0 | 0 | 1 | (0 > 1 > 2) or |
| 0 | 1 | 0 | 1 | 0 | 0 | (0 > 1 > 2) or |
| 0 | 1 | 0 | 0 | 1 | 0 | (0 > 1 > 2) |
| 0 | 0 | 1 | 1 | 0 | 0 | n/a |
| 1 | 0 | 0 | 0 | 1 | 0 | n/a |
| 1 | 0 | 0 | 0 | 0 | 1 | (1 > 0 > 2) or |
| 0 | 1 | 0 | 0 | 0 | 1 | (1 > 0 > 2) or |
| 0 | 1 | 0 | 1 | 0 | 0 | (1 > 0 > 2) |
| 0 | 0 | 1 | 1 | 0 | 0 | n/a |
| 1 | 0 | 0 | 0 | 1 | 0 | n/a |
| 0 | 0 | 1 | 0 | 0 | 1 | (1 > 2 > 0) or |
| 0 | 0 | 1 | 0 | 1 | 0 | (1 > 2 > 0) or |
| 0 | 1 | 0 | 0 | 0 | 1 | (1 > 2 > 0) |
| 0 | 0 | 1 | 1 | 0 | 0 | n/a |
| 0 | 0 | 1 | 0 | 1 | 0 | n/a |
| 0 | 0 | 1 | 0 | 0 | 1 | (2 > 1 > 0) or |
| 0 | 1 | 0 | 0 | 1 | 0 | (2 > 1 > 0) or |
| 0 | 1 | 0 | 1 | 0 | 0 | (2 > 1 > 0) |
| 1 | 0 | 0 | 1 | 0 | 0 | n/a |
| 0 | 0 | 1 | 0 | 1 | 0 | n/a |
| 1 | 0 | 0 | 0 | 0 | 1 | (0 > 2 > 1) or |
| 0 | 1 | 0 | 0 | 0 | 1 | (0 > 2 > 1) or |
| 0 | 1 | 0 | 0 | 1 | 0 | (0 > 2 > 1) |
| 1 | 0 | 0 | 1 | 0 | 0 | n/a |
| 0 | 0 | 1 | 0 | 1 | 0 | n/a |
| 0 | 0 | 1 | 0 | 0 | 1 | (2 > 0 > 1) or |
| 0 | 1 | 0 | 0 | 0 | 1 | (2 > 0 > 1) or |
| 0 | 1 | 0 | 1 | 0 | 0 | (2 > 0 > 1) |

Referring still to FIG. 6, the present invention also includes a quadrilateral split state machine 720 implemented in logic that receives the same three inputs 751a from the (>, <, =) flags of the processor mathematical unit 410 as the triangle state machine 715. The quadrilateral state machine 720 also receives a quadrilateral clear (quad_clear) or reset signal over line 751c from the instruction decoder unit 450a and also receives an enable signal over line 751d to indicate that the processor 401a is comparing the dot products of the surface normal vectors associated with vertex0 and vertex2 find vertex1 and vertex3. Depending on the result of this comparison, the quadrilateral split state machine 720 outputs a signal over line 791 into the combinational logic 710. If the quadrilateral was split over vertex0 and vertex2 then line 791 is asserted, else it is not asserted.

Similar to the triangle state machine, the quadrilateral state machine 720 of the present invention indirection mechanism does not perform the dot product comparison, but rather inputs the result via lines 715a and performs the quadrilateral split function via line 791. Specifically, while the processor 401a performs the dot product calculation between the surface normals of vertex0 and vertex2 and between the surface normals of vertex1 and vertex3, the instruction decoder unit 450a asserts the enable line 751d to the quadrilateral state machine 720. The result of the comparison is signaled over lines 751a as either >, < or = and these lines are coupled to the quadrilateral state machine. The quadrilateral state machine 720 will then indicate via line 791 the result of this comparison. If the less than (<) flag of lines 751a is indicated while line 751d is enabled then line 791 will indicate that a split along vertex0 and vertex2 was performed because the dot product of the normals to vertices 0 and 2 was smaller then the dot product between the normals to vertices 1 and 3. If the greater than (>) or equal (=) flag of lines 751a is indicated while line 751d is enabled then line 791 will indicate that a split along vertex1 and vertex3 was performed because the dot product of the normals to vertices 0 and 2 was larger than or equal to the dot product between the normals to vertices 1 and 3. Upon assertion of the triangle clear signal 751c, the quadrilateral state machine 720 is reset.

Combinational Logic 710 of the Present Invention

The combinational logic 710 of FIG. 6 receives inputs from four separate groups. It first receives the ymin 730c, ymid 730b, and ymax 730a signals. It also receives a selection mode signal which is carried over two lines 712. Combinational logic 710 also receives a one line signal 765 which determines which of the two triangles to select when a quadrilateral polygon is the input primitive. The combination logic also receives an input 791 that determines which way, or in which direction, a particular quadrilateral polygon was split (i.e., 0,2 or 1,3 direction). The combinational logic utilizes all of these inputs in order to generate four output selection lines 0–3, shown as lines 776, 775, 774, and 773 respectively. Each output selection line determines which memory unit 701a–701d will be coupled to which address/data bus 411, 412, 413 and 414. Select line0 776 determines which memory unit will be interconnected to address/data bus0 411, selection line1 775 determines which memory unit will be interconnected to address/data bus1 412, selection line2 774 determines which memory unit will be interconnected to address/data bus2 413, and lastly select line3 773 determines which memory unit will be interconnected to address/data bus3 414.

The possible values that the two signals that the selection mode input, lines 712, can input to the combinational logic are further shown in detail in the below Table II.

TABLE II

| Status of Line 712 | Selection Mode |
| --- | --- |
| 0 0 | Triangle State Machine Only |
| 0 1 | Quadrilateral State Machine Only |
| 1 0 | Both State Machines |
| 1 1 | Direct Map (Pass through) |

The selection for triangle state machine only mode typically occurs by the present invention when only triangle primitives are being rendered by the processors 401a–401d. The quadrilateral state machine only selection is typically utilized when the triangle vertex comparison is being performed by the processors. The both triangle and quadrilateral state machine selection is performed when interconnecting the memory units 701a–701d to the address/data busses 411–414 for rendering a selected triangle of a split quadrilateral input primitive. Lastly, the direct or pass through selection is done when: 1) the primitive data is first loaded by the system into the memory units 701a–701d; or 2) when all four vertices of a loaded quadrilateral primitive are first accessed by the mathematical unit 410a in order to determine the dot product comparisons. These selection modes will be discussed further in the processing or operational flow discussions of the preferred embodiment present invention to follow.

Table III below indicates the vertices (and memory units) of the triangles that are selected according to the present invention combinational logic by the four select lines 773, 774, 775, and 776 during a quadrilateral rendering by a processor 401a. It is appreciated that during triangle rendering, the combinational logic always selects the (0, 1, 2) triangle since that is the only triangle available in the four memory units. The left column indicates the vertices of the particular triangle selected by the combinational logic given the inputs from line 765 and 791 and line 712=10.

TABLE III

| Triangle Selection (Line 765) | Split Direction (Line 791) | Vertices Used (Memory Unit) |
| --- | --- | --- |
| 0 | 0 | (0, 1, 3) |
| 1 | 0 | (1, 2, 3) |
| 0 | 1 | (0, 1, 2) |
| 1 | 1 | (0, 2, 3) |

Triangle selection over line 765 selects which triangle (A or B) of the split quadrilateral primitive is currently selected for rendering, since each triangle is rendered in sequence by the processors of the present invention. Line 791 indicates which direction the quadrilateral was split so that the combinational logic will realize which vertices to select for triangle A or triangle B. For example, when line 791 indicates that the quadrilateral was split over vertices 0 and 2, then the first triangle is composed of vertices (0, 1, 2) while the second, or B triangle, is composed of vertices (0, 2, 3). Both triangles contain the edge (0, 2) since that was the edge that split the quadrilateral.

Figure 10A:
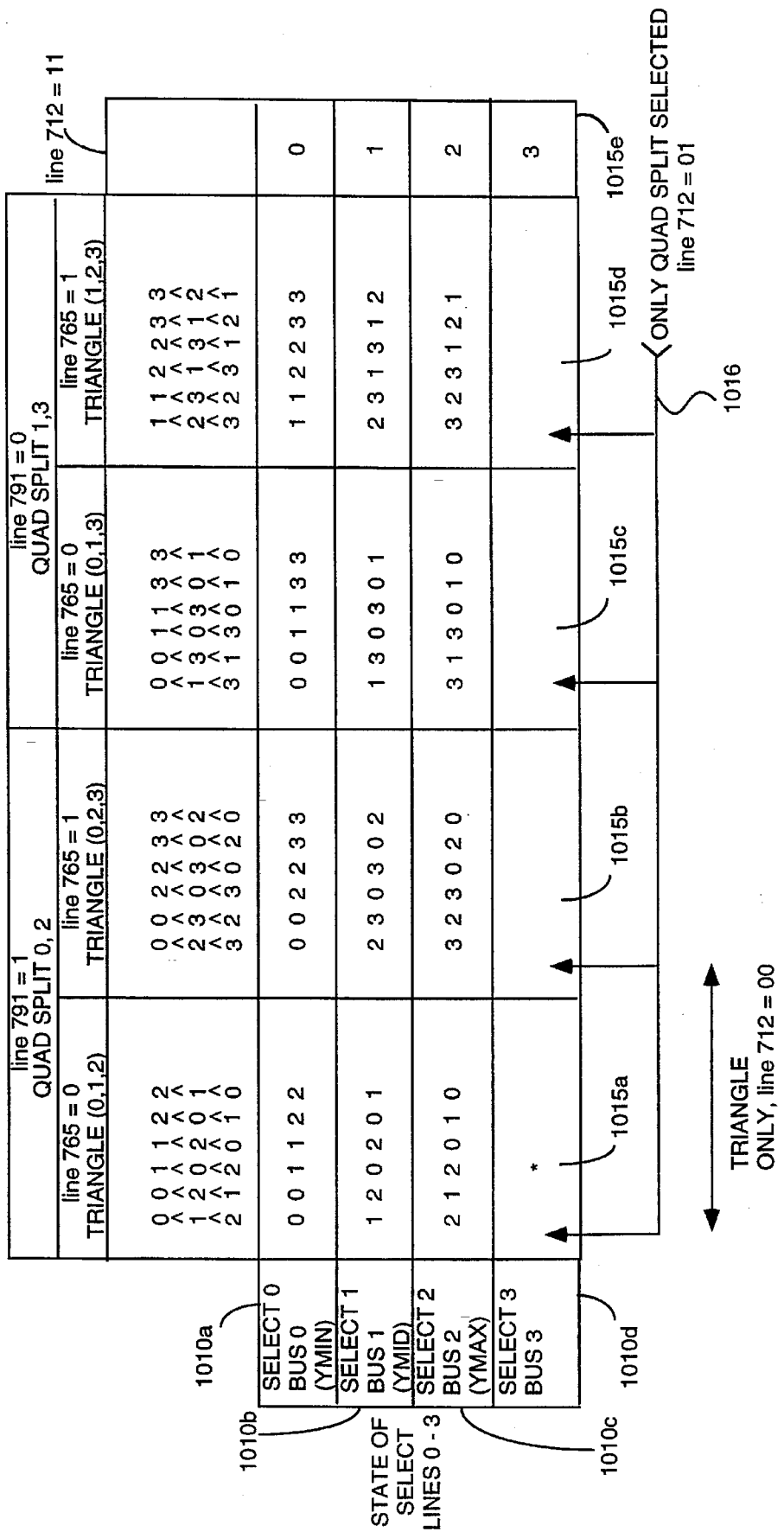
FIG. 10(A) is a logic mapping diagram of the present invention illustrating the output select lines of the combinational logic for given selection modes (over line 712) and other inputs.

A detailed memory mapping of the inputs and outputs of the combinational logic is shown in FIG. 10(B) for the selection mode (line 712=10) using both the triangle and quadrilateral state machines, which is the most complex mapping selection. It should be noted that when the selection for triangle only (line 712=00) is made over line 712, the select lines 776, 775, and 774 will map directly to the values of the ymin over line 730c, ymid over line 730b, and ymax, over line 730a respectively. In this case the signals 765 and 791 are not required since the primitive is a triangle and not a quadrilateral. When the selection is for direct map (line 712=11) the selection lines 0–3 are constant and select0 776 indicates memory0 701a, select1 775 indicates memory1 701b, select2 774 indicates memory2, and select3 773 indicates memory3 701d. When the selection for quadrilateral state machine only (line 712=01) is selected then the select lines0–3 will map according to the four indicated columns 1016 of FIG. 10(A). This condition will be further discussed below.

Referring back to FIG. 10(B), row 1081 illustrates the input status of line 791 (to the combinational logic) which determines in which direction a quadrilateral primitive was split. Row 1082 is an input signal 765 that determines which triangle (A or B) is selected by the present invention for the current rendering process. Column 1083 is not an input, this column indicates the state or current vertex ordering of the vertices depending their y coordinate value. Row 1084 indicates the value of the pointer ymin at line 730c from the triangle state machine 715. Row 1085 indicates the value of the pointer ymid at line 730b from the triangle state machine 715. Lastly, row 1086 indicates the ymax pointer at line 730a from the triangle state machine 715. Based on these input values, rows 1087–1090 indicate all the possible output values that the combinational logic unit 710 can output over the selection lines 776–773, respectively. Notice that selection 3, line 773, is not enabled since during a triangle rendering process (after the quadrilateral was split), the address/data bus3 414 is not required to carry any data; therefore it will never interconnect to a memory unit. By utilizing the inputs and outputs of this memory map, the combinational logic conditions and equations can be generated and the combinational logic unit 710 can be implemented in a PAL or programmable read only memory device.

Cross Point Circuit 705 of the Present Invention

Figure 7:
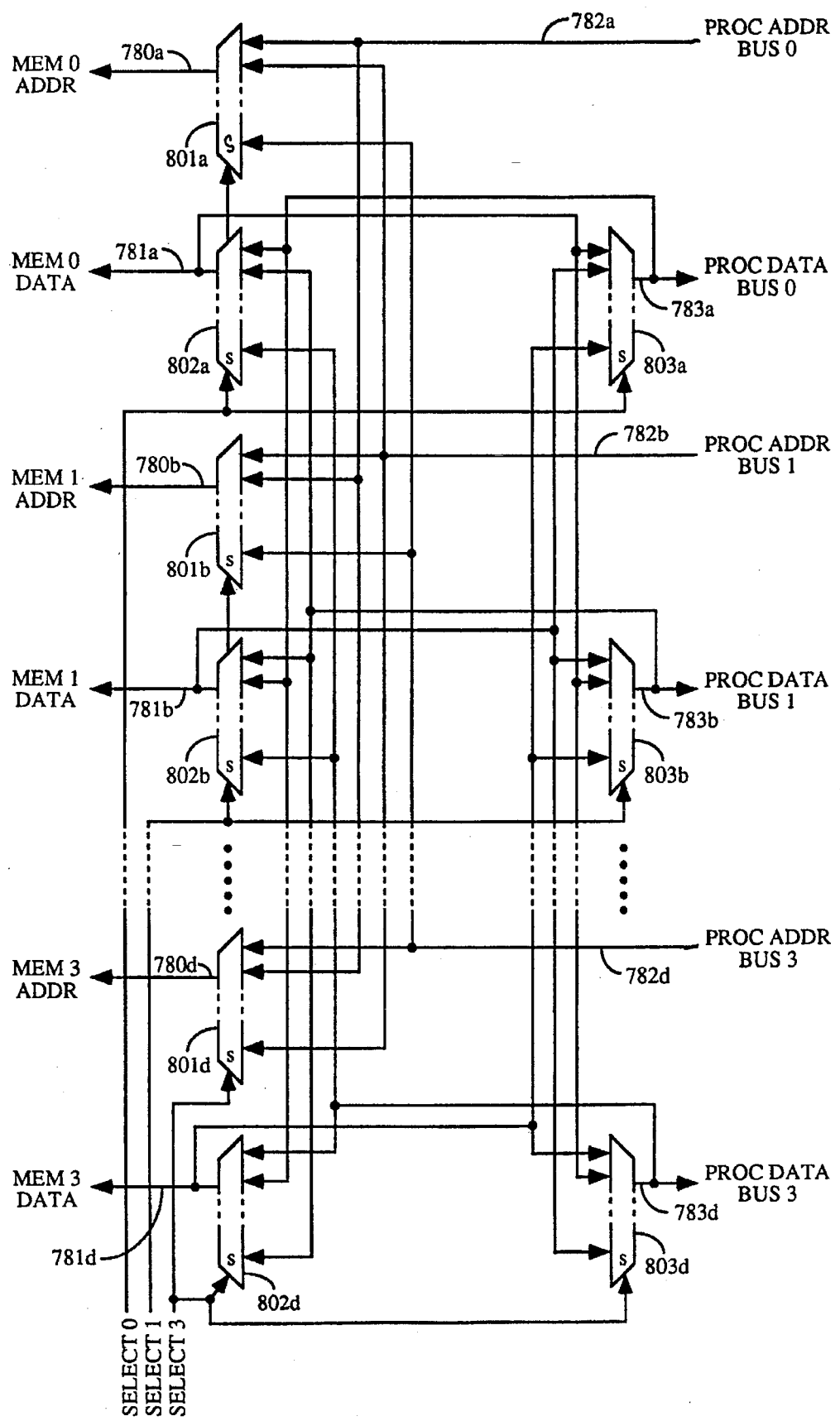
FIG. 7 is a detailed schematic of the circuitry of the cross point circuit of the indirection mechanism of the present invention.

FIG. 7 illustrates the details of the implementation of the cross point circuit 705 of the preferred embodiment of the present invention. The memory address lines (780a–780d) and the memory data lines (781a–781d) are illustrated for each of the four memory units (701a–701d) respectively. For clarity, only three of the four stages of the circuit are illustrated in FIG. 7. It is appreciated that the third stage of the circuit (for select line2 774) is analogously implemented to that of the other stages, as will be described in detail to follow. The output lines from the cross point circuit to the processor mathematical unit 410 over the four busses (0–3) are also illustrated. Selection lines 0 to 3 (776, 775, 774 and 773) are coupled to different stage multiplexer components (801a–801d), (802a–802d), and (803a–803d) in order to route the four address/data bus lines from the processor 410 to the respective four memory units, depending on the values of the selection lines, which have two signals for each line.

All four memory data lines 781a to 781d are coupled to the inputs of each of the four multiplexers 803a to 803d. The outputs of each of the multiplexers, respectively, create the data bus lines 783a to 783d which are data bus lines 0–3 respectively. Selection line0, 776, selects for the bus0 and selects for multiplexer 803a, selection line1, 775, selects for the bus1 and selects for multiplexer 803b, selection line2, 774, selects for the bus2 and selects for multiplexer 803c (not shown), and selection line3, 773, selects for the bus3 and selects for multiplexer 803d. Therefore, depending on the value of any of the particular selection lines (each can assert four different states since there are two input lines per selection0–3), data will be routed from any of the four memory units to the data bus represented by the selection line. For instance, selection line0 can route data from any of the four memory units 701a–701d to the data bus 783a which represents the ymin vertex value in the preferred embodiment of the present invention. Selection line2 (not shown) can route data from any of the four memory units 701a–701d to the data bus 783c which represents the ymax vertex value in the preferred embodiment of the present invention. Selection line3 routes data from any of the four memory units to bus3 which is used in quadrilateral split computations. Finally, selection line1 routes data from any of the four memory units to data bus used for the ymid value computations of processor 401a. Vertex data is pulled from the four memory units according to the present invention and fed to the mathematical unit of the processor when a particular geometric primitive is being rendered.

Referring still to FIG. 7, likewise, data from any of the four data bus lines (0–3) 783a–783d, can be routed from the mathematical unit 410 to any of the four memory units via four multiplexers 802a–802d respectively. All of the data bus lines 783a–783d are fed to the input of each multiplexer 802a–802d. The output of each multiplexer 802a–802d forms memory data lines 0–3 respectively for data input to the memory units from the processor 401a. Selection line0 776 is fed to multiplexer 802a, selection line1 775 to multiplexer 802b, selection line2 774 (not shown) is fed to multiplexer 802c, and selection line3 773 is fed to multiplexer 802d. Data flows into the four memory units when the vertex data for a geometric primitive's data structure is initially loaded into the processor 401a for rendering. The last stage of the multiplexing units 801a–801d is for routing the address lines of address busses 0–3 to each of the four memory units so that a particular address line can address the selected memory unit. All of the address lines of busses 0–3 is coupled to the input of each of the multiplexers 801a–801d. The output of each of the multiplexers 801a–801d form the address lines 780a–780d respectively. Selection lines 0–3 are coupled to each multiplexer 801a–801d respectively. Selection line0 routes one of the address lines (782a–782d) from busses 0–3 to memory 0, selection line1 routes one of the address lines to memory 1, selection line2 routes one of the address lines to memory 2 (not shown), and selection line3 routes one of the address lines (782a–782d) to memory 3.

According to this cross point circuit 705 of the present invention, the two bit value generated over selection line0 776 will route information between the memory unit associated with that value and address/data bus 411 (address 782a, data 783a), the two bit value over selection line1 775 will route information between the memory unit associated with that value and address/data bus 412 (address 782b, data 783b), the two bit value over selection line2 774 will route information between the memory unit associated with that value and address/data bus 413 (address 782c, data 783c), and the two bit value over selection line3 773 will route information between the memory unit associated with that value and address/data bus 414 (address 782d, data 783d).

FIG. 10(A) illustrates the values of the selection lines 0–3 according to rows 1010a (selection line0 for BUS0), 1010b (selection line1 for BUS1), 1010c (selection line2 for BUS2) and 1010d (selection line3 for BUS3) given: the state of the quad split (line 791); the state of the triangle A or B selection (line 765); and the particular order of the vertex data according the y screen values. When the line 712 indicates direct pass through (line 712=11) then column data 1015e is realized by the combinational logic. This is used to initially load the vertex data into the four memories or to initially access the four vertices of a quadrilateral primitive in order to determine the split direction; therefore all busses are active. When line 712 indicates that triangle state machine only is selected (line 712=00) then the combinational logic only outputs those selections as indicated by column 1015a. This is used after a ymin, ymid, ymax determination is made using triangle primitives only. When line 712 indicates that only quadrilateral state machine is selected (line 712=01) then only the first subcolumn of each of the columns 1015a–1015d is allowed as an output, indicated by reference 1016. This is used to access a selected triangle following a quadrilateral split for performing screen y comparisons. Lastly, if both triangle and quadrilateral state machine mode is selected (line 712=10) then all the outputs across all the columns 1015a–1015d are allowed by the combinational logic. This is used just after a ymin, ymid, ymax determination for a triangle subprimitive in a split quadrilateral primitive. It is appreciated that bus3 is only used when initially accessing a quadrilateral for splitting direction. Once split, only the three vertices of the resulting triangle subprimitives are required by the present invention and therefore bus3 is no longer needed.

According to the preferred embodiment of the present invention, the indirection mechanism 700a, in part by virtue of the cross point circuit 705, eliminates the need for the six conditional branchings pathways of the prior art systems. The present invention provides the cross point unit 705, the combinational logic 710, the triangle state machine 715 and quadrilateral state machine 720 to perform, in hardware, the conditional branching. By eliminating these branchings pathways, and instead indirecting the data paths for the primitive's vertex data, one specialized routine for computing the slopes, partial derivatives and sub-pixel corrections can be implemented. The routine implemented by the present invention expects the ymin values over bus0 411, the ymid values over bus1 412, and the ymax values over bus2 413. Bus3 is used for quadrilateral split computations. By indirecting the vertex data from the vertices of a triangle primitive (which may occupy three of the memories 0–3) to bus0, bus1, and bus2, the same routine can process of the geometric primitives. Since only one routine can be used for all triangle primitive, a SIMD architecture for multiprocessor capability is ideal since the same instruction bus 402 can be fed to each of the processors operating in parallel. While each of the processors operate to render a different geometric primitive, utilizing the same program routine for loading the hardware scan converters, the selection lines 773–776 for each processor 401a–401d will provide the differentiation between the vertex ordering of each geometric primitive to properly supply the vertices in the proper order to the mathematical unit 410 which is driven the single specialized routine.

Processing Flow of the Rendering Routines of the Present Invention

The following discussions describes how the components of the present invention are utilized in conjunction with the procedure for rendering a triangle primitive and a quadrilateral primitive. The decoder units 450a–450d of each processor are capable of decoding the steps indicated in the flow diagrams and supplied over the common instruction bus 402 by the instruction fetch and sequencer unit 420. All of the process steps are stored in instruction memories 112, 113.

Figure 8:
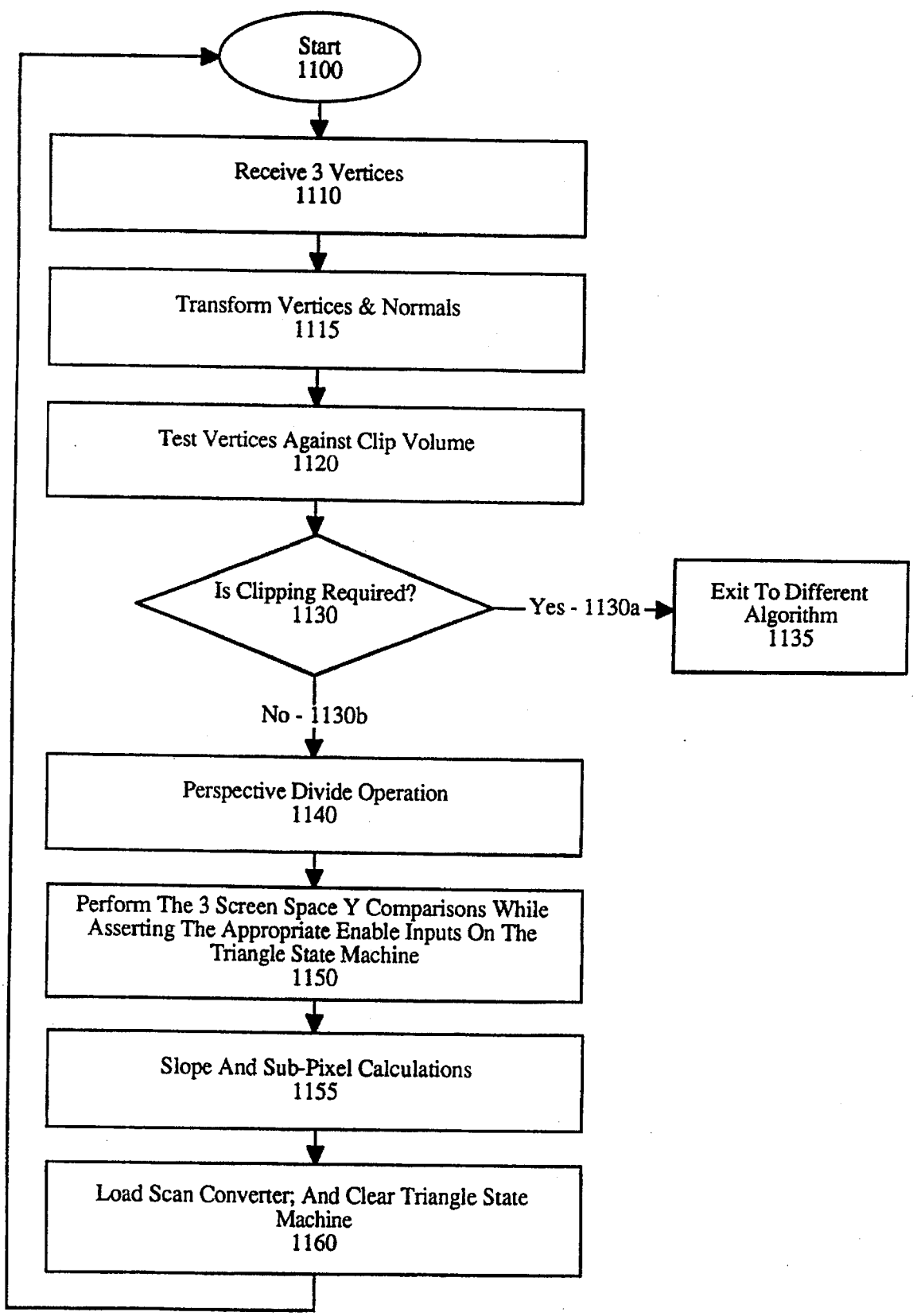
FIG. 8 is a processing flow diagram illustrating the processing steps executed by the present invention for rendering a triangle primitive.

FIG. 8 illustrates the major processing steps executed by each of the processors 401a–401d as each renders a particular triangle geometric primitive according to the present invention. It is appreciated as to the extent this flow is described with respect to the execution steps performed by a single processor 401a, which is done for clarity, it should be understood that each processor from 401a to 401d is simultaneously executing each of these instructions and process steps in identical fashion on a different triangle primitive. This is the case because each processor shares the same instruction bus 402. For instance, block 1110 indicates that data associated with three vertices of a primitive is received into the memory unit 701a of each processor over separate load busses of data bus 403. What is meant is that the vertices of four different geometric primitives are received by the four memory units with each processor 401a–401d.

The rendering process flow of the preferred embodiment of the present invention for a triangle primitive is illustrated in FIG. 8. Processing of the present invention begins at block 1100 and continues to block 1110. At block 1110, the selection mode is set to direct pass through (line 712=11) and processor 401a receives an entire data structure (all three vertices) representing a triangle primitive from the FIFO 428 block over bus 403. These vertices are initially loaded into memory unit0 (a ping pong memory unit) for the entire primitive. This data is then shifted into the other two memories 1 to 2 (701b–701c) so that each memory unit has data for a single vertex. Vertex0 data (i.e., position, color, surface normal) goes in memory0, vertex1 data into memory1, and vertex2 data into memory2. Since this is a triangle primitive originally, selection lines 765 (triangle A/B) are not used and neither is selection line 791 (the split direction indicator). Once the data is loaded into the memory units of each processor 401a–401d, the present invention then continues to block 1115 where the data is read from the memory units (by straight through mode mapping) and the initial world coordinates (referenced from a global point) of the vertex data are transformed into the eye coordinate scheme which is referenced from the vantage point of the user selected eye position and vantage for screen display. The eye coordinate values are in three dimensions. Next, the vertex data is tested at block 1120 for clipping. This is the exception handling step as mostly the processing will determine that clipping is not required. If clipping is required, it will be determined at branching block 1130 and processing will exit the present invention via block 1135.

If no clipping of the triangle primitive is required, the present invention will direct the processor 401a to block 1140 where the triangle primitive is projected from the three dimensional eye coordinates onto the screen display plane in two dimensions. In this step, the three dimensional eye coordinates (x, y, z) are transformed ("projected") by the mathematical unit 410 into two dimensional screen coordinates (x and y). The perspective divide or projection processing used to convert a three dimensional primitive onto a screen display plane, knowing the view's eye vantage and position is well known. One such technique is disclosed at pages 231–271 of *Computer Graphics Principles and Practice*, by James D. Foley, Andries van Dam, et al., Addison-Wesley Publishing, second edition (1990). The present invention processor 401a utilizes such techniques to accomplish the processing of block 1140. It is appreciated that the data representing the location and surface normal vectors for each vertex of the triangle are transformed into the screen display plane by the processor 401a. This data is then loaded back into the respective four memory units via the straight through or direct pass mode at selection mode (712=11) and a copy of this data is retained by the processor 401a. It is appreciated that the particular vertex ordering of the triangle primitive is irrelevant to the processing required by blocks 1115 and 1140 of the present invention.

After the data associated with the triangle primitive has been transformed into the (x, y) screen plane, the rendering processing of the present invention continues at block 1150. At this block each of the y coordinate screen locations of each vertex is tested according to a set order. It is appreciated that any order of comparison may be selected as long as the proper enable pin (751e, 751f, 751g) is asserted for its associated vertex pair comparison. For illustration a particular order is adopted. At this point, the selection mode 712 is still set to direct pass through mode. At block 1150, first the present invention directs the mathematical unit 410 of the processor 401a to compare the y coordinate values associated with vertex0 and vertex1 stored in memory0 and memory1 over bus0 and bus1 respectively. As the result of this comparison (via compare flags >=<) is sent by the mathematical unit 410 over lines 751, the processor asserts line 751e (751f, 751g are deasserted) and this result is loaded into triangle state machine 715. Second, the present invention instructs the processor 401a to compare the y coordinate values of vertex1 to vertex2. As the result is sent over lines 751, the processor enables pin 751*f* (751*e*, 751*g* are deasserted) to lock this result into the triangle state machine 715. Third, the processor 401*a* via mathematical unit 410 compares the y coordinate value of vertex0 to vertex2 and the result is generated over compare flags of lines 751 and enable 751*g* is asserted (751*f*, 751*e* are deasserted). Note that this comparison operation can be performed using simple direct pass mode (line 712=11) since the geometric primitive is a triangle and the vertices must reside within memory0, memory1, and memory2.

Refer to FIG. 8. Processing of the present invention then continues to block 1155. At this time, the triangle state machine 715 hardware of the present invention will follow the programming illustrated in Table I to generate signals on the output ymax, ymid, and ymin lines 730*a*, 730*b*, and 730*c* respectively, according to the results of the comparisons. The pointer lines 730*a*–730*c* will indicate to the combinational logic 710 which selection lines 776, 775, 774, 773 to assert in order to couple the three memory units 701*a*–701*c* to which busses 411–413. (Note that. memory3 and bus3 414 are not used since the primitive is a triangle with only three vertices.) At this point in processing block 1155, the selection mode 712 is changed from direct pass through to triangle only mode processing (line 712=00). During triangle only processing, the selection lines 0–2 will adopt the value of the ymin, ymid and ymax pointers of the triangle state machine 715 which are illustrated in column 1015*a* of FIG. 10(A). Since there are six different combinations of vertex orderings by y coordinate value, there are six different combinations that the selection lines 0–2 can adopt. Each of the combinations is illustrated as a separate subcolumn within column 1015*a*. According to the present invention, once the triangle only mode is selected, the combinational logic and the cross point multiplexer 705 will direct the busses 411, 412, and 413 to the memory units holding the ymin, ymid, and ymax vertices, respectively, for the current triangle primitive.

Figure 1:
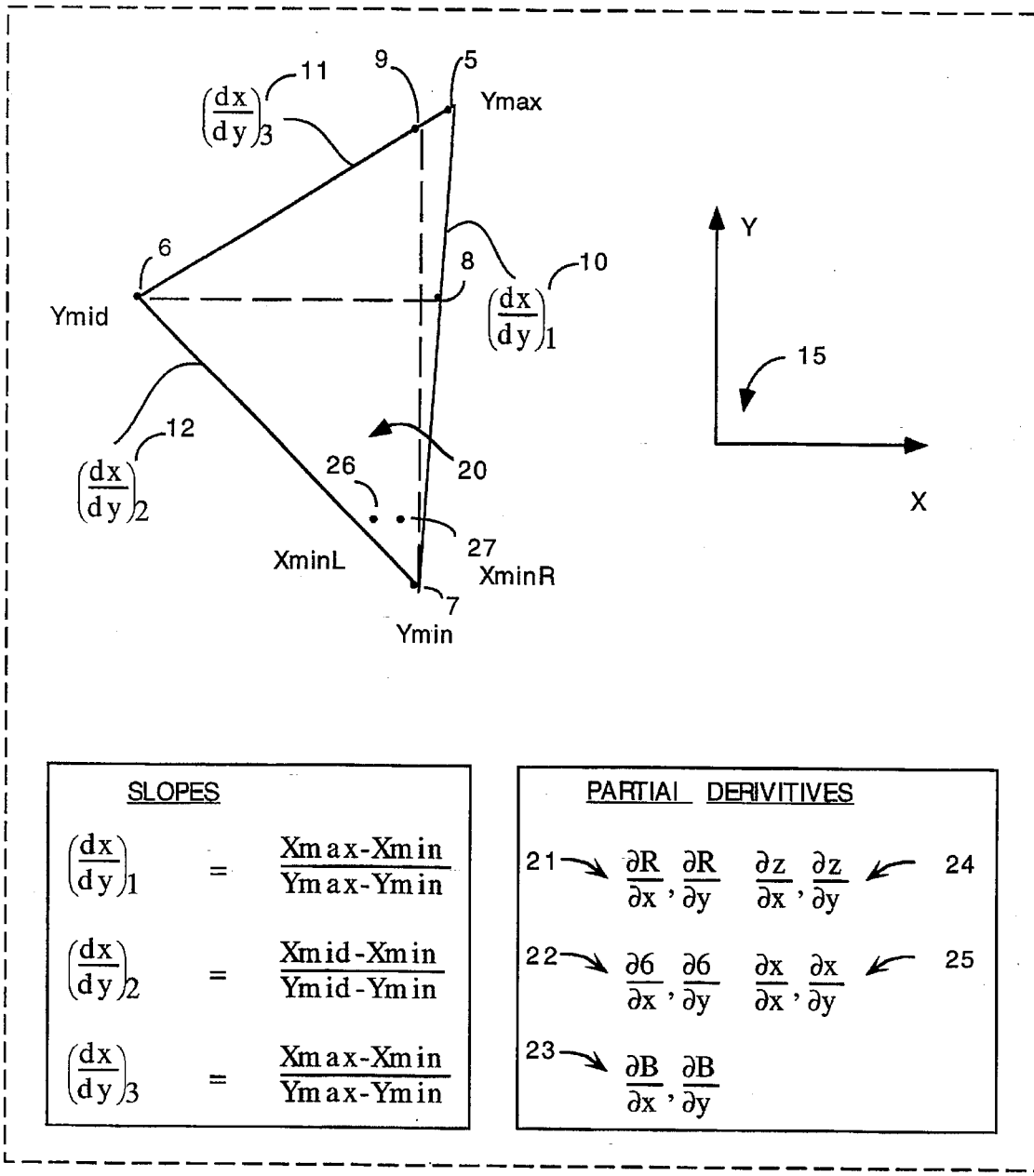
FIG. 1 illustrates a triangle primitive and processing calculations to be determined for output to a hardware scan converter. These determinations are utilized by the prior art and by the present invention.

At block 1155 of FIG. 8, the present invention then directs the mathematical unit 410 to input the vertex data for the geometric primitive according to the order set by the selection lines of the combinational logic 710 and implemented by the cross point multiplexer 705. Assuming for illustration that the vertex ordering was 0>2>1 then memory0 is coupled to bus2 413, memory2 is coupled to bus1 412 and memory1 is coupled to bus0 411. The present invention then computes the three slopes for each edge of the triangle primitive; the partial derivatives for red, green, blue, etc. for both x and y; the sub-pixel correction calculations; and any initial point location and attribute computations required. These calculations are illustrated in FIG. 1. The present invention utilizes a specialized computation routine executed by the mathematical unit 410 and the instruction decoder unit 450*a* that expects the ymin value over bus 411, the ymid value over bus 412 and the ymax value over bus 413; the cross point circuit 705 creates this order by multiplexing the input memories to the output busses. It is appreciated that only one specialized routine is used according the present invention by all of the processors 401*a*–401*d* for all of the six possible vertex orderings.

Next, at processing block 1160, all of the values computed in block 1155 of the present invention are output by processors 401*a*–401*d* via buses 430*a*–430*d* to the FIFO units 425*a*–425*d* respectively. Each of the four FIFO units is then sequentially read by the scan converter hardware unit 427 which is then enabled so that it may generate pixel patterns for each of the four primitives defined by the parameters computed by block 1155 and supplied to each of the FIFO units via block 1160. These pixel patterns are then sent to the display system 105 via bus 120 for integration and displayed onto a display screen utilizing a frame buffer memory as an intermediary. At this point, the triangle state machine 715 is cleared by the present invention via a pulse by tri__clear signal 751*b*. Then the present invention directs the processors to return to block 1110 where four more primitives are loaded for rendering, one each into the four processors. The above process flow of FIG. 8 continues until all of the geometric primitives for a particular display have been computed and displayed on the .display screen of system 105.

It is appreciated that all of the branching conditions and paths of the prior art have been eliminated in the preferred embodiment of the present invention. This allows for a streamlined code requiring only one specialized routine for slope and sub-pixel calculations. Each of the four SIMD processors executing the process illustrated in FIG. 8 are said to be in lockstep and are fully utilized.

The rendering process of the present invention for the quadrilateral primitive is more complex than the triangle primitive because the quadrilateral process requires first that a quadrilateral primitive be split into two triangle subprimitives and that each triangle subprimitive be processed separately. Since a quadrilateral primitive can be split down two different axis, there are four possible triangle subprimitives with which to be concerned. Also, since the vertices for each triangle subprimitive may exist within any three of the memories 0–4, the combinational logic 710 must track which three memories hold the vertices of interest for any given triangle subprimitive. It is appreciated as to the extent this flow is described with respect to the execution steps performed by a single processor 401*a*, which is done for clarity, it should be understood that each processor from 401*a* to 401*d* is simultaneously executing each of these instructions and process steps of FIGS. 9(A) and 9(B) in identical fashion on a different quadrilateral primitive. This is the case because each processor shares the same instruction bus 402 and is executing the procedure of FIG. 9(A) and 9(B) simultaneously.

Figure 9A:
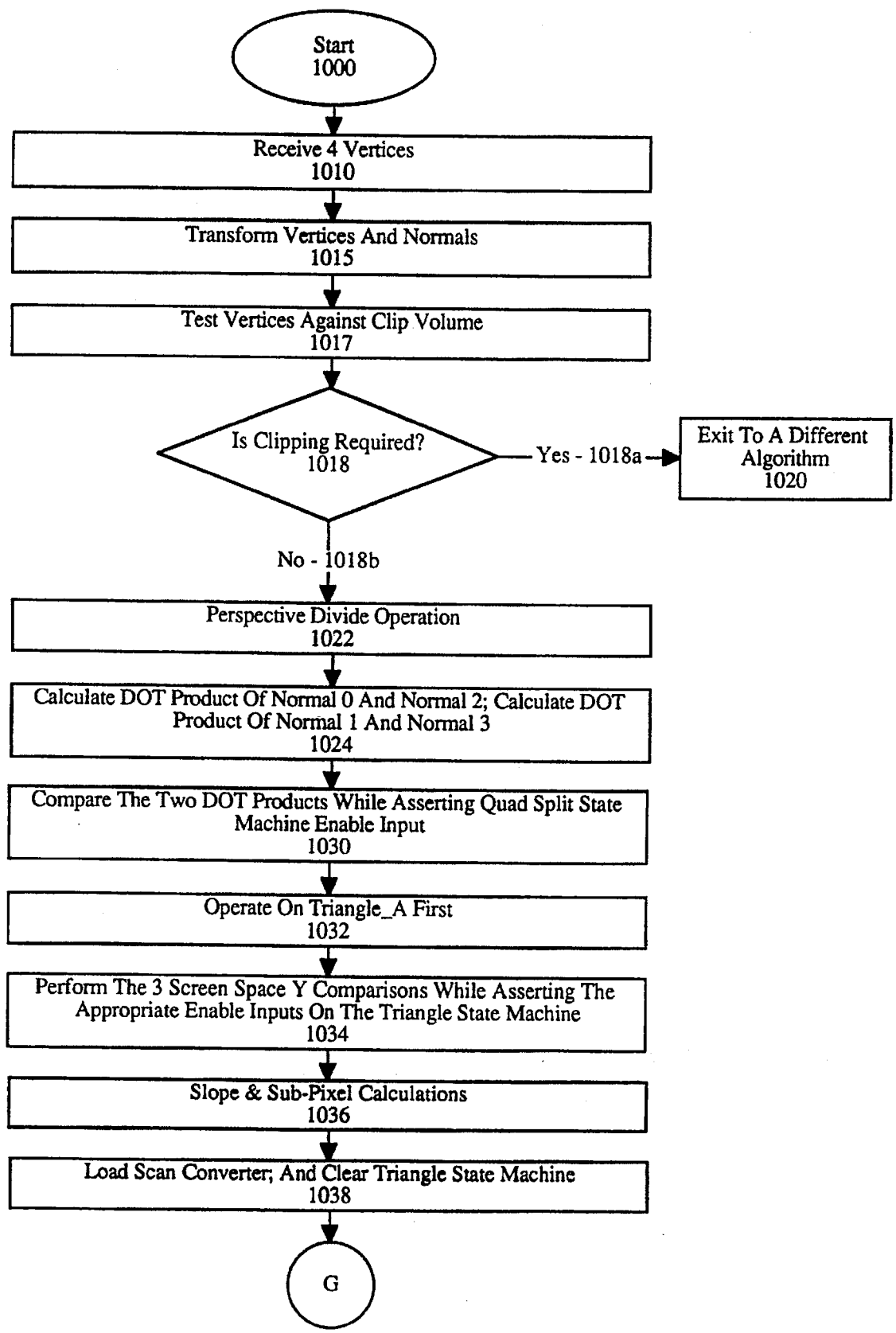
FIG. 9(A) and FIG. 9(B) are processing flow diagrams illustrating the processing steps executed by the present invention for rendering a quadrilateral primitive having two triangle subprimitives.

Refer to FIG. 9(A). Processing of the quadrilateral rendering process of the preferred embodiment of the present invention begins at block 1000 and continues to block 1010 where the selector 712 is set to the direct through indication mode (line 712=11). At block 1010 memory unit 701*a* for each processor receives an entire data structure (all four vertices) representing a quadrilateral primitive from the FIFO 428 block over bus 403. These vertices are initially loaded into memory unit0 (a ping pong memory unit) for the entire primitive. This data is then shifted into the other three memory units 1 to 3 (701*b*–701*d*) so that each memory unit has data for a single vertex. A quadrilateral primitive is spread over the four memory units 701*a*–701*d*. Data for each vertex 0 to 3 is loaded into memory units 0 to 3 respectively, all memories are utilized to store the quadrilateral data structure. With the selection on direct pass through, this data is read by the processor 401*a* over busses 411–414. At block 1015 of the present invention, the location data and surface normals associated with each vertex of the four vertices are then transformed from the three dimensional world coordinate scheme into the three dimensional eye coordinate scheme referencing the vantage point of the user or viewer by the mathematical unit 410. At blocks 1017 and 1018 the present invention checks if quadrilateral clipping is required which is the exception handling branch. If clipping is required processing of the present invention is terminated for this quadrilateral at block 1020. As is mostly the case, no clipping is required and processing then continues to block 1022 where the three dimensional eye coordinates of the data associated with each vertex of the quadrilateral is transformed or projected into the two dimensional screen plane (x, y) using well known techniques of projection which were discussed with respect to block 1140. At block 1022, the mathematical unit 410 transforms the positional and surface normal vector data associated with each vertex from the eye (x, y, z) coordinate space into the screen (x, y) coordinate space irrespective of vertex orderings.

Using the direct pass through mode (line 712=11) selection, the present invention next accesses all of the surface normals associated with each of the vertices of the quadrilateral primitive irrespective of vertex orderings. At block 1024 the mathematical unit of the processor 401a performs two computations. First, the present invention instructs it to compute the dot product of the surface normal associated with vertex0 and the surface normal associated with vertex2. This is the 0,2 dot product. Second, it computes the dot product of the surface normal associated with vertex1 and the surface normal associated with vertex3. This is called the 1,3 dot product. This information is stored within registers of the processor 401a. Next, at block 1030 the present invention causes line enable signal line 751d to be enabled and also directs the mathematical unit 410 to compare dot product 0,2 against dot product 1,3. The result of this comparison is fed over the compare flag lines 751a to the quadrilateral state machine 720. Since the enable line 751d is asserted, the quadrilateral state machine will assert line 791 if the dot product of 0,2 is smaller than the product 1,3. If this is not the case, then line 791 will not be asserted. If dot product 0,2 is smaller than dot product 1,3 then the quadrilateral primitive will be split across the axis from vertex0 to vertex2, otherwise the quadrilateral primitive will be split across vertex1 to vertex3. Line 791 indicates the direction of quadrilateral split according to the programming of the quadrilateral split state machine 720.

FIG. 10(A) and Table III indicates the four different triangle subprimitives that can be generated as a result of the two different quadrilateral splits. If the quadrilateral is split across vertex0 to vertex2 then the two triangles are: A=(0, 1,2) and B=(0,2,3). If vertex1 and vertex3 are used then the triangles are: A=(0,1,3) and B=(1,2,3). Referring back to FIG. 9(A), once the quadrilateral is split according to the assertion of line 791, the present invention proceeds to block 1032 where the first triangle subprimitive of the triangle pair is processed for rendering. At this point the triangle A or B selection line 765 will be asserted for triangle A. If this line is "0" then triangle A will be selected and if this line is "1" then triangle B will be used. Depending on the direction of the quad split, triangle A will be either triangle (0,1,2) or triangle (0,1,3). The ymin, ymid, ymax vertices must now be identified by the present invention for the selected A triangle. The present invention now selects the quadrilateral state machine only mode (line 712=01). In this mode, depending on the quadrilateral split direction the combinational logic 710 will adopt the values as illustrated in the first subcolumn for columns 1015a, and 1015c of FIG. 10(A). For instance, if the split was down vertices 1,3 (line 791=0) and since triangle A was selected (line 765=0) then the select lines from the combinational logic would adopt the ordering shown in the first subcolumn of column 1015c for triangle (0, 1, 3). Select0 776 which directs for bus0 will carry the value 0 and therefore couple memory0 to bus0. Select1 775 which directs for bus1 will carry 1 and therefore direct memory1 to bus1. Select2 774 which directs for bus2 will carry 3 and therefore couple memory3 to bus2. At this point, the mathematical unit merely inputs the three vertices (0, 1, 3) making up the selected A triangle for the 1,3 split and no vertex ordering or y coordinate comparisons have been generated. To this extent, the select lines may adopt any subcolumn within column 1015c for this selected triangle subprimitive so long as the correct triangle is selected, i.e., the correct three memory units of the four are accessed.

Refer back to FIG. 9(A). Once the mathematical unit 410 reads the three vertex data as indicated by bus0, bus1 and bus2, it performs the three comparison functions of block 1034. The present invention first directs the mathematical unit 410 to compare the y coordinate value of the first vertex (over bus0) to the y coordinate value of the second vertex (over bus1) and generate a comparison result over lines 751a while asserting the 0,1 enable line 751e. Second, the mathematical unit 410 to compares the y coordinate value of the second vertex (over bus1) to the y coordinate value of the third vertex (over bus2) and generate a comparison result over lines 751a while asserting the 1,2 enable line 751f. Third, the mathematical unit 410 to compares the y coordinate value of the first vertex (over bus0) to the y coordinate value of the third vertex (over bus2) and generate a comparison result over lines 751a while asserting the 0,2 enable line 751g. The triangle state machine will then following the logic as shown in FIG. 10(B) and Table I over lines 730a, 730b, and 730c to indicate the ymax, ymid, and ymin vertices respectively. These pointer lines are fed into the combinational logic 710.

Next, once the ymax, ymid, and ymin values are indicted by the triangle state machine 715, the present invention flows to block 1036 of FIG. 9(A) where the mode selection line placed into the both triangle and quadrilateral state machine mode (line. 712=10). In this mode, the combinational logic 710 will generate the appropriate select line outputs depending on: 1) the signals at lines 765 (A or B selection) and 791 (split direction); and 2) the ymin, ymid and ymax inputs 730 from the triangle state machine. The select lines are generated according to the mapping of FIG. 10(B). For instance, referring to FIG. 10(B), assuming line 791=0 and line 765=0 (the above triangle) and further assuming that the condition was (2>0>1) according to the triangle state machine 715, then the combinational logic 710 would output select0=1, select1=0, select2=3 and select3 not used. This routes the ymin (memory 1) over bus0, the ymid (memory 0) over bus1 and the ymax (memory 3) over bus2. All of this is performed by the combinational logic 710 and the two state machines.

Once the select lines have been determined, the present invention at block 1036 then reads the vertex data (of the four memories) for the given A triangle subprimitive as being multiplexed by the cross point indirection circuit 705 across the three bus lines 0–2 according to the order specified by the select lines and shown in FIG. 10(B). The present invention at block 1036 of FIG. 9(A) then performs the three required slope calculations for each edge of the current A triangle subprimitive and also the partial derivative calculations, the sub-pixel correction calculations and the initial value determinations. All of this information for each primitive of each processing is then fed into the FIFO units 425a–d at block 1038 and the scan converter 427 is enabled to sequentially read each of the FIFO units 425a–d over bus 426 to generate the pixel pattern for triangle A which is then output to the frame buffer of the display unit 105. The triangle state machine 715 of the present invention is then cleared by pulsing line 751b.

Figure 9B:
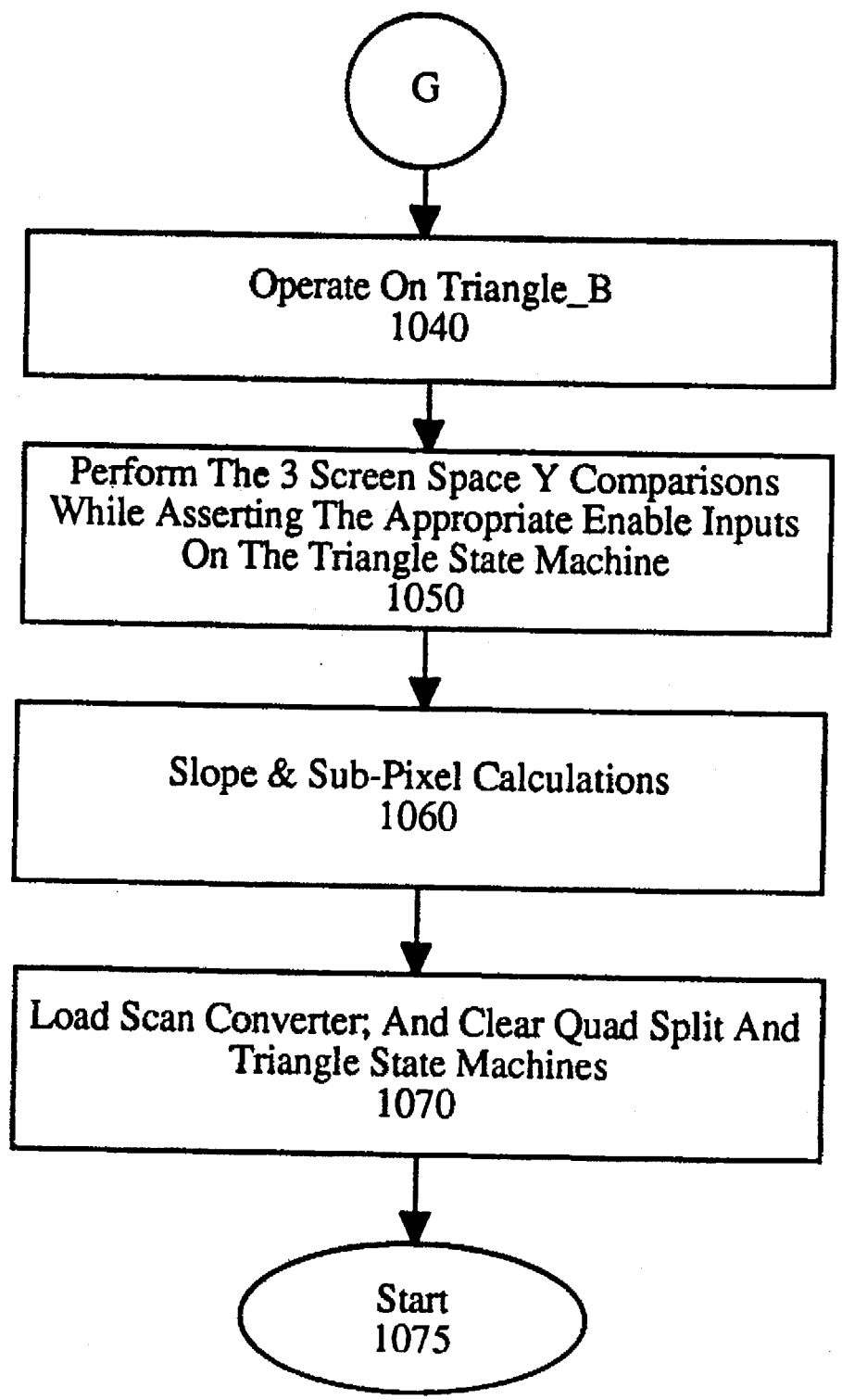

Refer to FIG. 9(B), where processing of the present invention next flows to block 1040 and the second triangle, B, is processed of the split quadrilateral. Line 712 is set into the quadrilateral only mode (line 712=01) and the signal at line 765 is changed from "0" to "1" to indicate that triangle B is now the selected triangle of the split pair. Assuming the split was across 1,3 then line 791 will remain 1. According to the output of FIG. 10(A), the combinational logic will follow the mapping values of columns 1015b and 1015d for triangle B depending on the split direction. In quadrilateral only mode for triangle B of the 1,3 split, the select lines will adopt the values as shown in the first subcolumn of column 1015d. They will select for memory units 1, 2 and 3 for vertices 1, 2, 3 of this triangle. The data associated with these vertices are now read from the three specified memory units via the cross point unit 705. At block 1050, the ymin, ymid, ymax coordinate comparisons are performed. The enable pin 751e is asserted while the first vertex y value is compared against the second vertex y value. The result is read via line 751a by the triangle state machine. Next, the enable pin 751f is asserted while the y values of the second vertex and the third vertex are compared. Lastly, the enable pin for the 751g is asserted while the y values of the first and the third vertices are compared. The state triangle state machine will then indicate the ymax, ymid, ymin values over the output lines 730a–730c according to Table I in a fashion similar to the processing of triangle A.

Next the present invention will assert over line 712 the both quad and triangle state machine mode (line 712=10). Assuming of the six combinations, the vertices adopt the order 3>1>2, this will cause the combinational logic to output the select lines as shown in the proper column 1015d. Select line0 will indicate memory2, select line1 will indicate memory1 and select line2 will indicate memory3. Using these select lines, the present invention will then proceed to block 1060 of FIG. 9(B) where the mathematical unit 710 reads the vertex data (of the four memories) for the given B triangle subprimitive as being multiplexed by the cross point indirection circuit 705 across the three bus lines 0–2 according to the order specified by the select lines and shown in FIG. 10(B). The present invention performs the three required slope calculations for each edge of the current B triangle subprimitive and also the partial derivative calculations, the sub-pixel correction calculations and the initial value determinations. All of this information for each primitive of each processor is then fed into the FIFO units 425a–d at block 1070 and the hardware scan converter 427 is enabled to sequentially read each of the FIFO units over bus 426 and generate the pixel pattern for triangle A which is then output to the frame buffer of the display unit 105 via bus 120. The triangle state machine 715 is then cleared by pulsing line 751b and the quadrilateral state machine 720 is then cleared by pulsing line 751c (quad_clear). The present invention then returns to block 1010 to process another four additional quadrilateral primitives.

It is appreciated that by performing the above, the present invention can simultaneously process four quadrilateral primitives using four multiprocessors 401a–401d in a SIMD architecture where each multiprocessor executes the same instruction code simultaneously.

Single Multiported Memory Embodiment of the Present Invention

An embodiment of the present invention utilizes a single multiported memory unit to contain the data structure of the geometric primitive for rendering. The multiported memory replaces the four memory units 701a–701d in the preferred embodiment. It is appreciated that the remainder of the SIMD environment of the preferred embodiment remains.

The multiported memory has four address busses as inputs and four output data busses. Each data bus of the multiported memory is output to data busses 411–414 respectively and the four address busses are multiplexed, via the selection lines, so that any bus 411–414 may be coupled to address any port of the memory. The multiported memory is capable of simultaneously being accessed by the four busses 411–414. In this case the selection lines (776, 775, 774, 773) direct the addressing of the multiported memory by the mathematical unit. A data structure is loaded into the multiported memory with data for each vertex residing in a different address of the multiported memory and the selection lines control addressing of the memory by the busses 411–414. Each data output is coupled to a specific data bus within 411–414. In so doing, bus 411 always addresses for the ymin vertex, bus 412 addresses for the ymid vertex and bus 413 addresses for the ymax vertex. Bus 414 is used to address the four vertex of a quadrilateral primitive. In such embodiment, the indirection mechanism effects the addressing of the multiported memory to arrive at the desired vertex ordering.

The preferred embodiment of the present invention, an indirection mechanism within a computer graphic display system for allowing multiple processor SIMD architecture to simultaneously process multiple geometric primitives having a data structure spread across multiple memory units to thus increase lockstep processor operation, is thus described. While the present invention has been described in one particular embodiment, it should be appreciated that the present invention should not be construed as limited by such embodiment, but rather construed according to the below claims.

What is claimed is:

1. An apparatus for rendering a geometric primitive composed of data associated with a plurality of vertices, said apparatus comprising:

a first circuit determining slopes based on said data associated with said plurality of vertices of said geometric primitive, each slope associated with an edge of said geometric primitive, said first circuit processing said data associated with said plurality of vertices in a predetermined vertex order, said first circuit coupled to a plurality of signal lines for receiving said data;

a plurality of memories for storing said data associated with said plurality of vertices, each memory for storing data associated with a separate vertex of said geometric primitive and each memory having a separate output line;

multiplexing circuitry coupled to said plurality of memories and coupled to said first circuit for intercoupling an output line of each memory to an individual signal line of said plurality of signal lines coupled to said first circuit, wherein said multiplexing circuitry simultaneously supplies said data associated with said plurality of vertices from said plurality of memories to said first circuit in said predetermined vertex order;

a second circuit generating comparison results of screen coordinate values between pairs of vertices of said geometric primitive; and a third circuit ordering said plurality of vertices of said geometric primitive according to said predetermined vertex order, said third circuit coupled to receive said comparison results from said second circuit and coupled to control said multiplexing circuitry.

2. An apparatus for rendering a geometric primitive as described in claim 1 further comprising:

a scan conversion unit generating a pixel pattern of said geometric primitive based on said slopes generated for each edge of said geometric primitive by said first circuit, said scan conversion unit coupled to said first circuit.

3. An apparatus for rendering a geometric primitive as described in claim 1 wherein said geometric primitive is a triangle having three vertices.

4. An apparatus for rendering a geometric primitive as described in claim 3 wherein said predetermined vertex order is based on a screen coordinate value associated with each vertex of said three vertices.

5. An apparatus for rendering a geometric primitive as described in claim 4 wherein said third circuit further comprises a pointer indicating said predetermined vertex order to said multiplexing circuitry, said pointer communicatively coupled to control said multiplexing circuitry.

6. An apparatus for rendering a geometric primitive as described in claim 4 wherein said screen coordinate value is a Y-axis coordinate value of a computer display screen.

7. An apparatus for rendering a geometric primitive as described in claim 3 wherein said predetermined vertex order is based on a screen coordinate value associated with each vertex of said three vertices and wherein each signal line coupled to said first circuit corresponds to an individual vertex of said plurality of vertices of said triangle primitive.

8. An apparatus for rendering a geometric primitive as described in claim 1 wherein said geometric primitive is a quadrilateral having four vertices.

9. An apparatus for rendering a geometric primitive as described in claim 8 wherein said predetermined vertex order is based on a screen coordinate value associated with each vertex of said four vertices and wherein:

said second circuit is also for generating a comparison result between a first dot product of surface normals associated with a first vertex and a third vertex and a second dot product of surface normals associated with a second vertex and a fourth vertex; and wherein said third circuit is also responsive to said second circuit and is also for splitting said quadrilateral primitive into two triangle subprimitives according to said comparison result, wherein said multiplexing circuitry is also for supplying said triangle subprimitives to said first circuit according to said predetermined vertex order.

10. An apparatus for rendering a geometric primitive as described in claim 9 wherein said predetermined vertex order is based on a screen coordinate value associated with each vertex of said four vertices and further comprising (a) a select indicator for selecting a first triangle subprimitive of said two triangle subprimitives;

(b) wherein provided said select indicator selects a first triangle subprimitive:

(i) said second circuit generates comparison results of screen coordinate values between pairs of vertices of said first triangle subprimitive;

(ii) said third circuit orders said vertices of said first triangle subprimitive according to said comparison results of screen coordinate values between pairs of vertices of said first triangle subprimitive; and (iii) a pointer indicates said predetermined vertex order to control said multiplexing circuitry based on said first triangle; and (c) wherein provided said select indicator selects a second triangle subprimitive:

(i) said second circuit generates comparison results of screen coordinate values between pairs of vertices of said second triangle subprimitive;

(ii) said third circuit orders said vertices of said second triangle subprimitive according to said comparison results of screen coordinate values between pairs of vertices of said second triangle subprimitive; and (iii) said pointer indicates said predetermined vertex order to control said multiplexing circuitry based on said second triangle subprimitive.

11. In a computer controlled graphics system including a display displaying computer generated images and a memory unit storing information representing geometric primitives, an apparatus for rendering said geometric primitives onto said display, said apparatus comprising:

a plurality of processors coupled to a common instruction bus according to a SIMD architecture, each processor simultaneously processing a separate geometric primitive, each processor further comprising:

a plurality of memory units for storing information representing said geometric primitive wherein information associated with each vertex of said geometric primitive is stored in a separate memory unit;

a mathematical processing circuit processing said information representing said geometric primitive in a predetermined vertex ordering to provide display information regarding said geometric primitive;

multiplexing circuitry coupled to said plurality of memory units and coupled to said mathematical processing circuit, said multiplexing circuitry simultaneously providing said information representing said geometric primitive from said plurality of memory units to said mathematical unit in said predetermined vertex ordering; and vertex order determining circuitry determining a vertex ordering of said geometric primitive and generating output pointers indicative of said vertex ordering, said vertex order determining circuitry coupled to receive comparison signals indicating results of comparisons of parameters associated with pairs of said vertices of said geometric primitive.

12. An apparatus as described in claim 11 further comprising a scan conversion unit accessing said display information regarding said geometric primitive for said each processor and generating therefrom a pixel pattern representative of said geometric primitive for each processor, said scan conversion unit coupled to each processor and coupled to said display.

13. An apparatus as described in claim 11 wherein said plurality of processors comprise at least four processors.

14. An apparatus as described in claim 11 wherein said comparisons of parameters associated with said vertices comprise comparisons of screen coordinate values associated with each of said vertices.

15. An apparatus as described in claim 11 further comprising:

geometric primitive splitting signal for splitting a geometric primitive into first and second geometric primitives and for indicating a split direction; and a combination circuit for generating select signals to instruct said multiplexing circuitry to couple said plurality of memory units to said mathematical processing circuit to realize said predetermined vertex ordering for said first geometric primitive or said second geometric primitive based on said vertex ordering and said split direction, said combination circuit communicatively coupled to said multiplexing circuitry and to said vertex order determining circuitry.

16. An apparatus as described in claim 15 wherein said first and said second geometric primitive are triangles.

17. An apparatus as described in claim 15 wherein said vertex order determining circuitry operates on a triangle primitive and said geometric primitive splitting signal operates on a quadrilateral primitive to form two triangle primitives.

18. In a computer controlled graphics system including a display displaying computer generated images and a memory unit storing information representing geometric primitives, an apparatus for rendering said geometric primitives onto said display, said apparatus comprising:

a plurality of processors coupled to a common instruction bus according to a SIMD architecture, each processor simultaneously processing a separate geometric primitive, each processor further comprising:

a first circuit determining slopes based on said information associated with said plurality of vertices of said geometric primitive, each slope associated with an edge of said geometric primitive, said first circuit processing said information associated with said plurality of vertices in a predetermined vertex order, said first circuit coupled to a plurality of signal lines for receiving said information;

a plurality of memories for storing said information associated with said plurality of vertices, each memory for storing information associated with a separate vertex of said geometric primitive and each memory having a separate output line;

multiplexing circuitry coupled to said plurality of memories and coupled to said first circuit for intercoupling an output line of each memory to an individual signal line of said plurality of signal lines coupled to said first circuit wherein said multiplexing circuitry simultaneously supplies said information associated with said plurality of vertices from said plurality of memories to said first circuit in said predetermined vertex order;

a second circuit generating comparison results of screen coordinate values between pairs of vertices of said geometric primitive; and a third circuit ordering said plurality of vertices of said geometric primitive according to said predetermined vertex order, said third circuit coupled to receive said comparison results from said second circuit and coupled to control said multiplexing circuitry.

19. An apparatus as described in claim 18 further comprising: a scan conversion unit generating a pixel pattern of said geometric primitive based on said slopes generated for each edge of said geometric primitive by said first circuit, said scan conversion unit coupled to said first circuit.

20. An apparatus as described in claim 18 wherein said predetermined vertex order is based on a screen coordinate value associated with each vertex of said three vertices.

21. An apparatus as described in claim 18 wherein said third circuit further comprises a pointer indicating said predetermined vertex order to said multiplexing circuitry, said pointer communicatively coupled to control said multiplexing circuitry.

22. An apparatus for rendering a geometric primitive as described in claim 18 wherein said predetermined vertex order is based on a screen coordinate value associated with each vertex of four vertices and wherein:

said second circuit is also for generating a comparison result between a first dot product of surface normals associated with a first vertex and a third vertex and a second dot product of surface normals associated with a second vertex and a fourth vertex; and wherein said third circuit is also responsive to said second circuit and is also for splitting a quadrilateral primitive into two triangle subprimitives according to said comparison result, wherein said multiplexing circuitry is also for supplying said triangle subprimitives to said first circuit according to said predetermined vertex order.

\* \* \* \* \*